(12) United States Patent
Yoshida

(10) Patent No.: US 9,436,593 B2
(45) Date of Patent: Sep. 6, 2016

(54) INFORMATION PROCESSING DEVICE

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/171,917

(22) Filed: Feb. 4, 2014

(65) Prior Publication Data

US 2014/0223132 A1 Aug. 7, 2014

(30) Foreign Application Priority Data

Feb. 7, 2013 (JP) ................. 2013-022367

(51) Int. Cl.
G06F 3/00 (2006.01)
G06F 13/12 (2006.01)
G06F 13/24 (2006.01)
G06F 12/02 (2006.01)
G06F 9/50 (2006.01)
G06F 3/06 (2006.01)

(52) U.S. Cl.
CPC ......... G06F 12/0223 (2013.01); G06F 9/5016 (2013.01); G06F 3/00 (2013.01); G06F 3/0634 (2013.01)

(58) Field of Classification Search
CPC .............. G06F 1/00; G06F 3/00; G06F 7/00; G06F 3/0634
USPC ..................... 710/62, 1, 4, 14, 261
See application file for complete search history.

(56) References Cited

U.S. PATENT DOCUMENTS

| | | | | |
|---|---|---|---|---|
| 6,441,917 B1 * | 8/2002 | Ikeda | ............... | G06F 5/065 358/1.16 |
| 6,470,051 B1 | 10/2002 | Campisano et al. | | |
| 7,139,849 B2 * | 11/2006 | Tojima | ............... | G06F 15/7857 710/22 |
| 2004/0068679 A1 * | 4/2004 | Vellolil | ............... | G06F 12/1009 714/42 |
| 2006/0064519 A1 * | 3/2006 | Patterson | ............... | G06F 3/0227 710/36 |
| 2006/0195706 A1 | 8/2006 | Burchard et al. | | |
| 2007/0180180 A1 * | 8/2007 | Torigoe | ............... | G06F 3/0613 710/310 |
| 2008/0016265 A1 | 1/2008 | Oshikiri et al. | | |
| 2008/0250172 A1 * | 10/2008 | Tanaka | ............... | G06F 3/0605 710/63 |
| 2012/0239953 A1 | 9/2012 | Kuroko | | |

FOREIGN PATENT DOCUMENTS

| | | |
|---|---|---|
| EP | 2288074 | 2/2011 |
| JP | 2924725 | 7/1999 |
| JP | 3761317 | 3/2006 |

OTHER PUBLICATIONS

Extended European Search Report dated Dec. 4, 2015.

* cited by examiner

*Primary Examiner* — Idriss N Alrobaye
*Assistant Examiner* — Getente A Yimer
(74) *Attorney, Agent, or Firm* — Ipusa, PLLC

(57) ABSTRACT

An information processing device includes a first information processing unit; and a second information processing unit connected to the first information processing unit through a data communication line, the second information processing unit including a plurality of information processors. The first information processing unit includes a data storage unit that stores data; a first table that defines correspondence between each of first operation modes of the first information processing unit and memory area sizes that are to be reserved for the corresponding information processors, wherein each of the first operation modes is determined by corresponding one of second operation modes of the second information processing unit; and a memory area allocation unit that allocates memory areas having the memory area sizes corresponding to a current one of the first operation modes to the corresponding information processors.

9 Claims, 31 Drawing Sheets

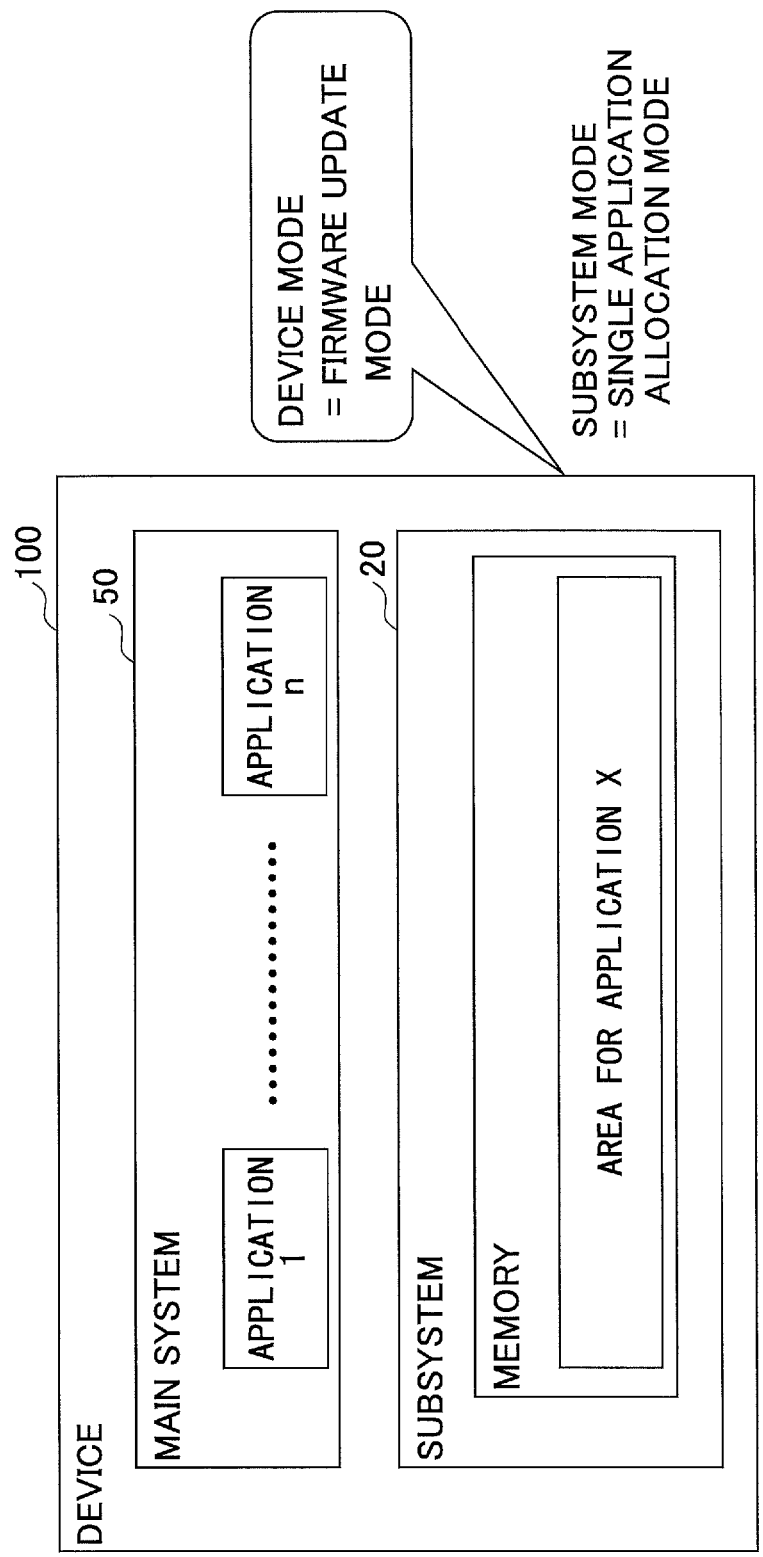

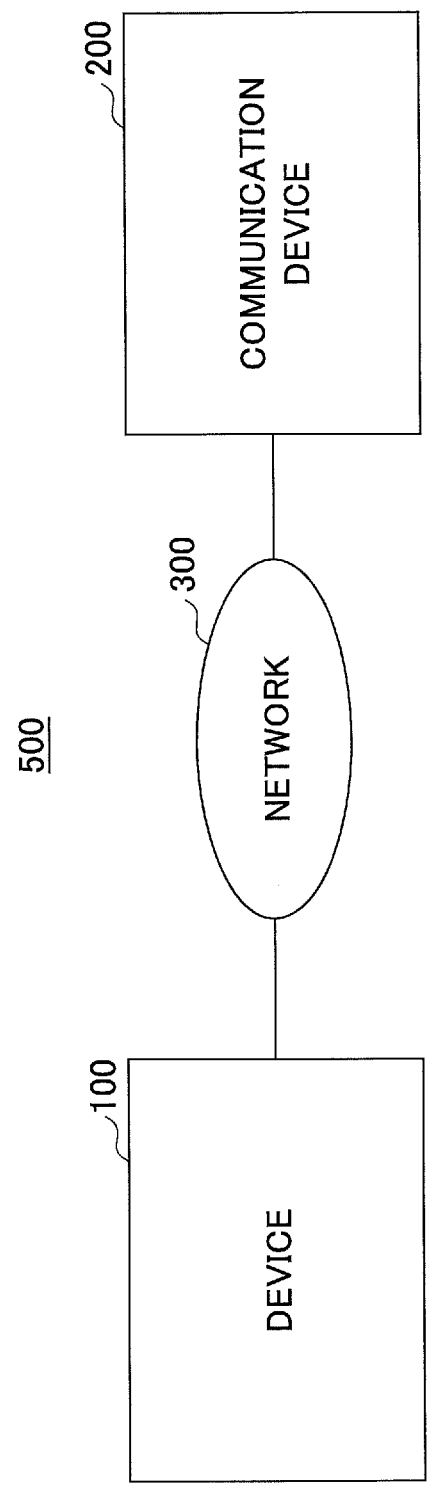

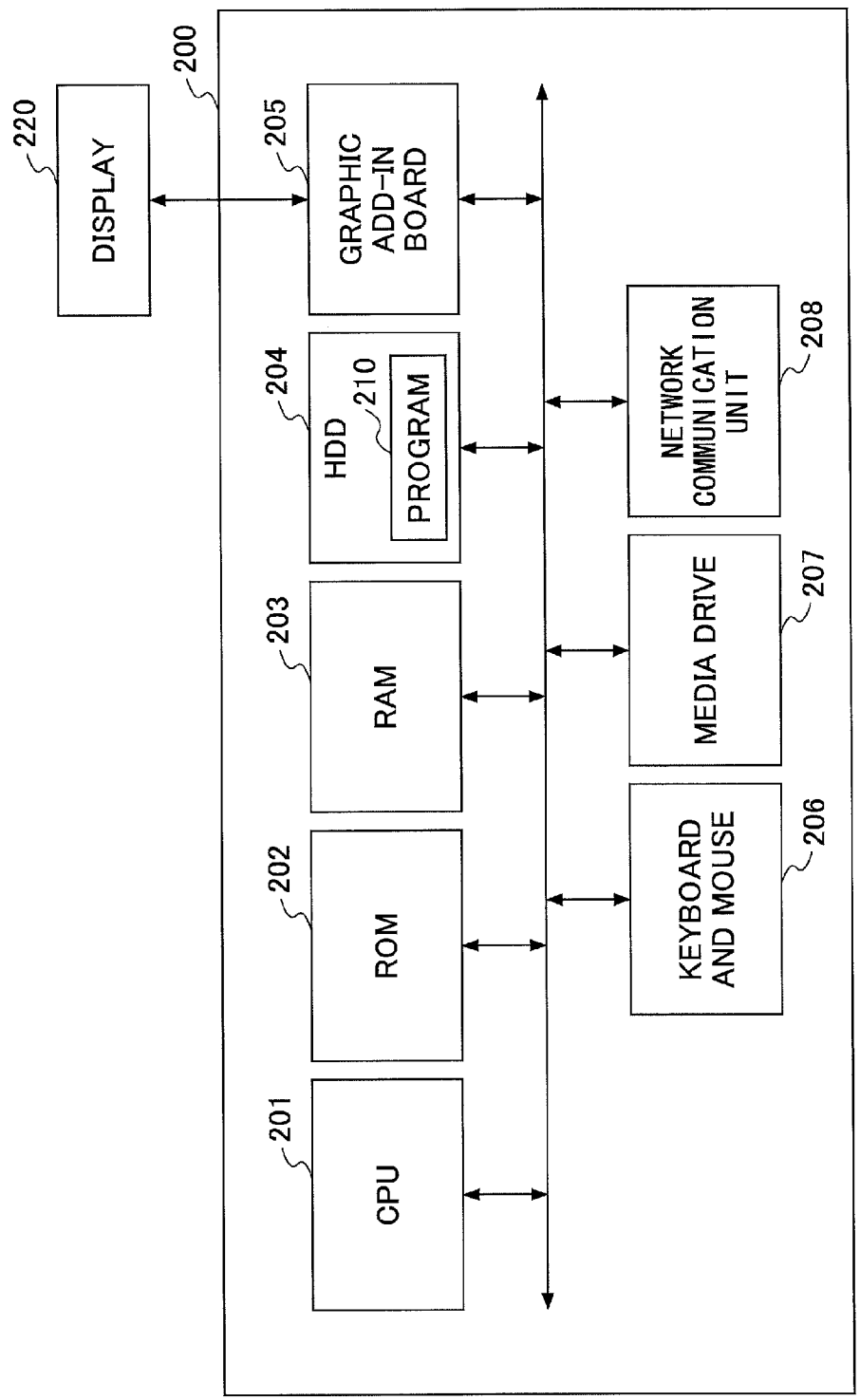

FIG.6A

| DEVICE MODE | SUBSYSTEM MODE |
|---|---|
| NORMAL MODE | NORMAL ALLOCATION MODE |
| VIDEO PROJECTION MODE | SINGLE APPLICATION ALLOCATION MODE |
| FIRMWARE UPDATE MODE | SINGLE APPLICATION ALLOCATION MODE |

FIG.6B

| SUBSYSTEM MODE | BUFFER AREA ALLOCATION METHOD |
|---|---|
| NORMAL ALLOCATION MODE | APPLICATION 1: TRANSMISSION 2k, RECEPTION 2k<br>APPLICATION 2: TRANSMISSION 32k, RECEPTION 2k<br>... |
| SINGLE APPLICATION ALLOCATION MODE | APPLICATION X: TRANSMISSION 2k, RECEPTION 64k |

FIG.9

| SUBSYSTEM MODE | BUFFER AREA ALLOCATION METHOD |
|---|---|
| NORMAL ALLOCATION MODE | APPLICATION 1:INTERNAL COMMUNICATION 2k<br>APPLICATION 2:INTERNAL COMMUNICATION 2k<br>... |
| SINGLE APPLICATION ALLOCATION MODE | APPLICATION X:INTERNAL COMMUNICATION 16k |

FIG.12A

| No. | DEVICE SETTING |
|---|---|
| 1 | TO SPEED UP PROCESSING DEPENDING ON APPLICATION |
| 2 | RECOMMENDED (DEFAULT SETTING) |

FIG.12B

No. 1 " TO SPEED UP PROCESSING DEPENDING ON APPLICATION "    51

| DEVICE MODE | SUBSYSTEM MODE |
|---|---|
| NORMAL MODE | NORMAL ALLOCATION MODE |
| VIDEO PROJECTION MODE | SINGLE APPLICATION ALLOCATION MODE |
| FIRMWARE UPDATE MODE | SINGLE APPLICATION ALLOCATION MODE |

No. 2 " RECOMMENDED (DEFAULT SETTING) "    51

| DEVICE MODE | SUBSYSTEM MODE |
|---|---|
| NORMAL MODE | NORMAL ALLOCATION MODE |
| VIDEO PROJECTION MODE | NORMAL ALLOCATION MODE |
| FIRMWARE UPDATE MODE | NORMAL ALLOCATION MODE |

FIG.15A

| No. | SUBSYSTEM BUFFER SETTING |
|---|---|
| 1 | BALANCE PRIORITIZED SETTING |
| 2 | SPEED PRIORITIZED SETTING |

FIG.15B

No.1 "BALANCE PRIORITIZED SETTING"  ~21

| SUBSYSTEM MODE | BUFFER AREA ALLOCATION METHOD |
|---|---|
| NORMAL ALLOCATION MODE | APPLICATION 1: TRANSMISSION 8k, RECEPTION 2k<br>APPLICATION 2: TRANSMISSION 8k, RECEPTION 2k<br>... |
| SINGLE APPLICATION ALLOCATION MODE | APPLICATION X: TRANSMISSION 2k, RECEPTION 32k |

No. 2 " SPEED PRIORITIZED SETTING"  ~21

| SUBSYSTEM MODE | BUFFER AREA ALLOCATION METHOD |
|---|---|
| NORMAL ALLOCATION MODE | APPLICATION 1: TRANSMISSION 2k, RECEPTION 2k<br>APPLICATION 2: TRANSMISSION 32k, RECEPTION 2k<br>... |
| SINGLE APPLICATION ALLOCATION MODE | APPLICATION X: TRANSMISSION 2k, RECEPTION 64k |

FIG.18

| ACCOUNT(USER) | DEVICE SETTING |
|---|---|
| tanaka | TO SPEED UP PROCESSING DEPENDING ON APPLICATION |
| suzuki | RECOMMENDED SETTING (DEFAULT SETTING) |
| yamada | TO SPEED UP PROCESSING DEPENDING ON APPLICATION |

FIG.23

| DEVICE MODE | SUBSYSTEM MODE | LIGHTING STATE |
|---|---|---|
| NORMAL MODE | NORMAL ALLOCATION MODE | OFF |
| VIDEO PROJECTION MODE | SINGLE APPLICATION ALLOCATION MODE | ON |
| FIRMWARE UPDATE MODE | SINGLE APPLICATION ALLOCATION MODE | ON |

FIG.26A

| LIGHTING STATE | DISPLAY PATTERN |
|---|---|
| OFF | LIGHTS OUT |
| ON | LIGHTING |

FIG.26B

| LIGHTING STATE | DISPLAY PATTERN |
|---|---|
| OFF | LIGHTING |
| ON | LIGHTS OUT |

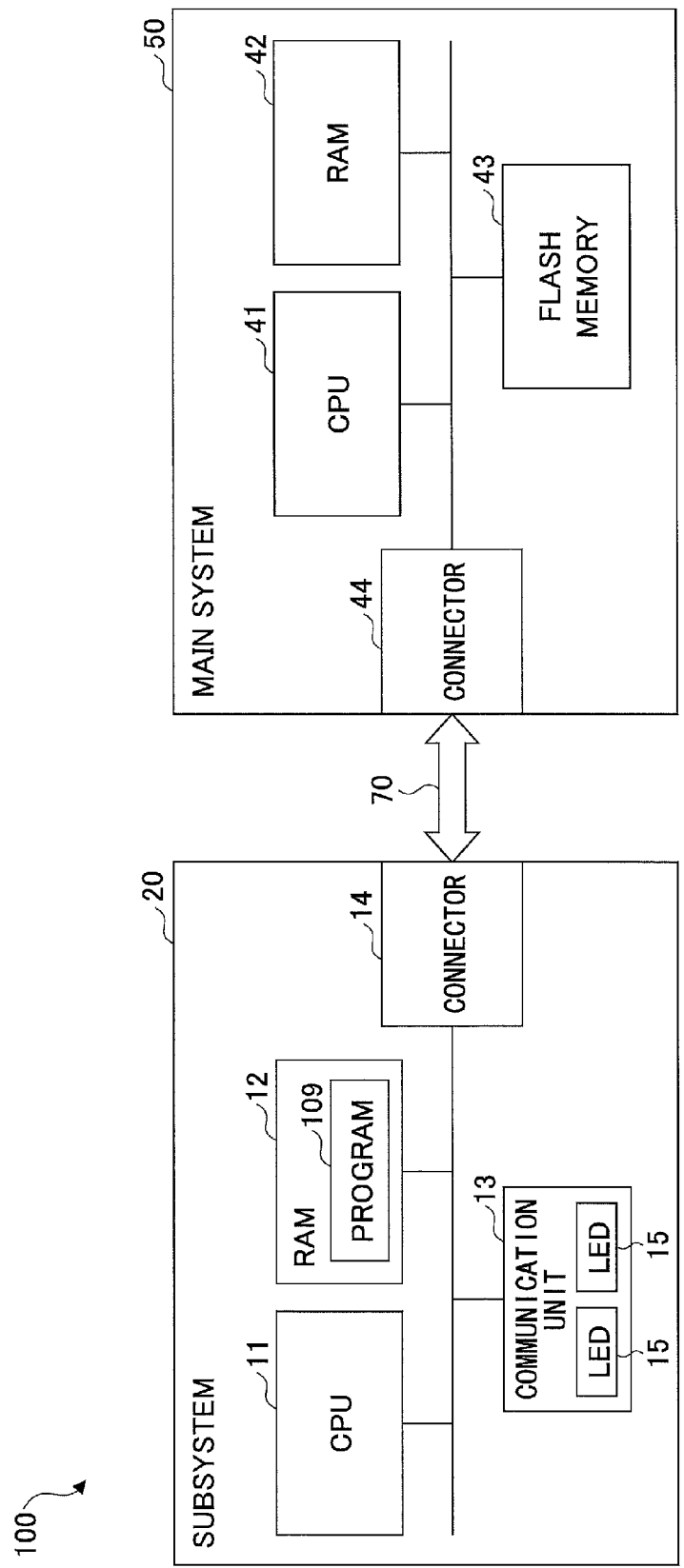

INFORMATION PROCESSING DEVICE

BACKGROUND OF THE INVENTION

1. Field of the Invention

The present invention relates to an information processing device that includes a first information processing unit including a communication unit for communicating with an external device; and a second information processing unit that is connected to the first information processing unit through a data communication line.

2. Description of the Related Art

In order to address a demand for reduction in power consumption, an information processing device can be divided into a plurality of power source domains. During the power saving mode in which the power consumption is reduced, a power control circuit reduces the power consumption by turning off power supplies other than power supplies for power source domains that correspond to predetermined necessary functions.

For example, a designer may define a communication function to be a single power source domain, and the designer can design the communication function as a subsystem. The designer may adopt a design such that, during a power saving mode, electric power is supplied only to the subsystem. A main system may be defined to be another power source domain. The main system may include, for example, a central processing unit (CPU). During the power saving mode, electric power is not supplied to the main system. As a consequence, during the power saving mode, the information processing device can reduce the power consumption, while performing communication.

Not only during the power saving mode, but also when power is supplied to the main system, the subsystem takes charge of communication of data that is used for an application operating in the main system. However, memory capacity and the like of the subsystem may be less than that of the main system. Namely, an amount of communication resources (e.g., a buffer) of the subsystem may be less than that of the main system or that of a server of a communication destination. The subsystem may only exchange a small amount of data during a single transmission and reception process. Consequently, supply of data to the application of the main system may be delayed. As described, in a system in which a subsystem and a main system are divided, and the subsystem takes charge of communication, the subsystem may be a bottleneck of the communication.

To overcome such a disadvantage, a size of a buffer to be allocated to a communication process may be varied (cf. Patent Document 1 (Japanese Patent No. 3761317), for example).

SUMMARY OF THE INVENTION

According to an aspect of the present invention, there is provided an information processing device including a first information processing unit including a communication unit configured to communicate with an external device; and a second information processing unit configured to be connected to the first information processing unit through a data communication line. The second information processing unit includes a plurality of information processors. The first information processing unit includes a data storage unit configured to store data received from the external device by the communication unit; a first table configured to define correspondence between each of first operation modes of the first information processing unit and memory area sizes that are to be reserved for the corresponding information processors to process the data, wherein each of the first operation modes of the first information processing unit is determined by corresponding one of second operation modes of the second information processing unit; and a memory area allocation unit configured to allocate memory areas having the corresponding memory area sizes to the corresponding information processors, wherein the memory area sizes correspond to a current one of the first operation modes of the first information processing unit in the first table, and the memory areas are included in the data storage unit.

According to another aspect of the present invention, there is provided an information processing device including a first information processing unit including a communication unit configured to communicate with an external device; a second information processing unit configured to be connected to the first information processing unit through a data communication line; a plurality of information processors; a data storage unit configured to store data that is received from the external device by the communication unit; a first table configured to determine correspondence between each of first operation modes of the first information processing unit and memory area sizes that are to be reserved for the corresponding information processors to process the data, wherein each of the first operation modes of the first information processing unit is determined by corresponding one of second operation modes of the second information processing unit; and a memory area allocation unit configured to allocate memory areas having the memory area sizes corresponding to a current one of the first operation modes of the first information processing unit in the first table to the corresponding information processors, wherein the memory areas are included in the data storage unit.

Other objects, features and advantages of the present invention will become more apparent from the following detailed description when read in conjunction with the accompanying drawings.

BRIEF DESCRIPTION OF THE DRAWINGS

FIGS. 1A and 1B are diagrams schematically illustrating an example of a device according to an embodiment that includes a subsystem;

FIG. 2 is a diagram schematically illustrating an example of a configuration of a network system including the device according to the embodiment;

FIG. 3B is a block diagram showing an example of a hardware configuration of a communication destination device;

FIG. 6A is a diagram showing an example of a device mode table;

FIG. 6B is a diagram showing an example of an allocation table;

FIG. 9 is a diagram showing another example of the allocation table;

FIG. 12A is a diagram showing an example of device settings for selecting corresponding device mode tables;

FIG. 12B is a diagram showing an example of the device mode tables corresponding to the device settings;

FIG. 15A is a diagram showing an example of subsystem buffer settings;

FIG. 15B is a diagram showing an example of the allocation tables corresponding to the subsystem buffer settings;

FIG. 18 is a diagram showing an example of an account table;

FIG. 23 is a diagram showing another example of the device mode table;

FIGS. 26A and 26B are diagrams showing examples of a display pattern table;

FIG. 27 is a diagram showing another example of the configurations of the main system and the subsystem;

DETAILED DESCRIPTION OF THE PREFERRED EMBODIMENTS

Patent Document 1 discloses a dynamic buffer allocation method. In the dynamic buffer allocation method, when a process to be executed issues a request for allocation of a buffer, a number of buffer blocks that are allocated to currently executed processes is reduced based on a priority order. In this manner, some buffer blocks to be allocated to the process to be executed are reserved, and the reserved buffer blocks are allocated to the process to be executed.

According to the buffer allocation method disclosed in Patent Document 1, the number of the buffer blocks to be reduced is determined based on the priority order of the currently executed processes. As a consequence, when a plurality of processes having higher priority is concurrently executed, the buffer blocks to be allocated to the process to be executed may be insufficient. In other words, for each of the processes that are currently executed, the minimum required buffer blocks are reserved. Consequently, only a small number of buffer blocks may be allocatable to the process to be executed. The shortage of allocatable buffer blocks can be a bottleneck of communication.

For a device including a subsystem, there is a need for preventing the subsystem from being a bottleneck of communication.

Hereinafter, an embodiment of the present invention is explained by referring to the accompanying drawings. However, the scope of the present invention is not limited to the embodiment. With an information processing device according to the embodiment of the present invention, a subsystem can be prevented from being a bottleneck of communication.

Figure 1A:
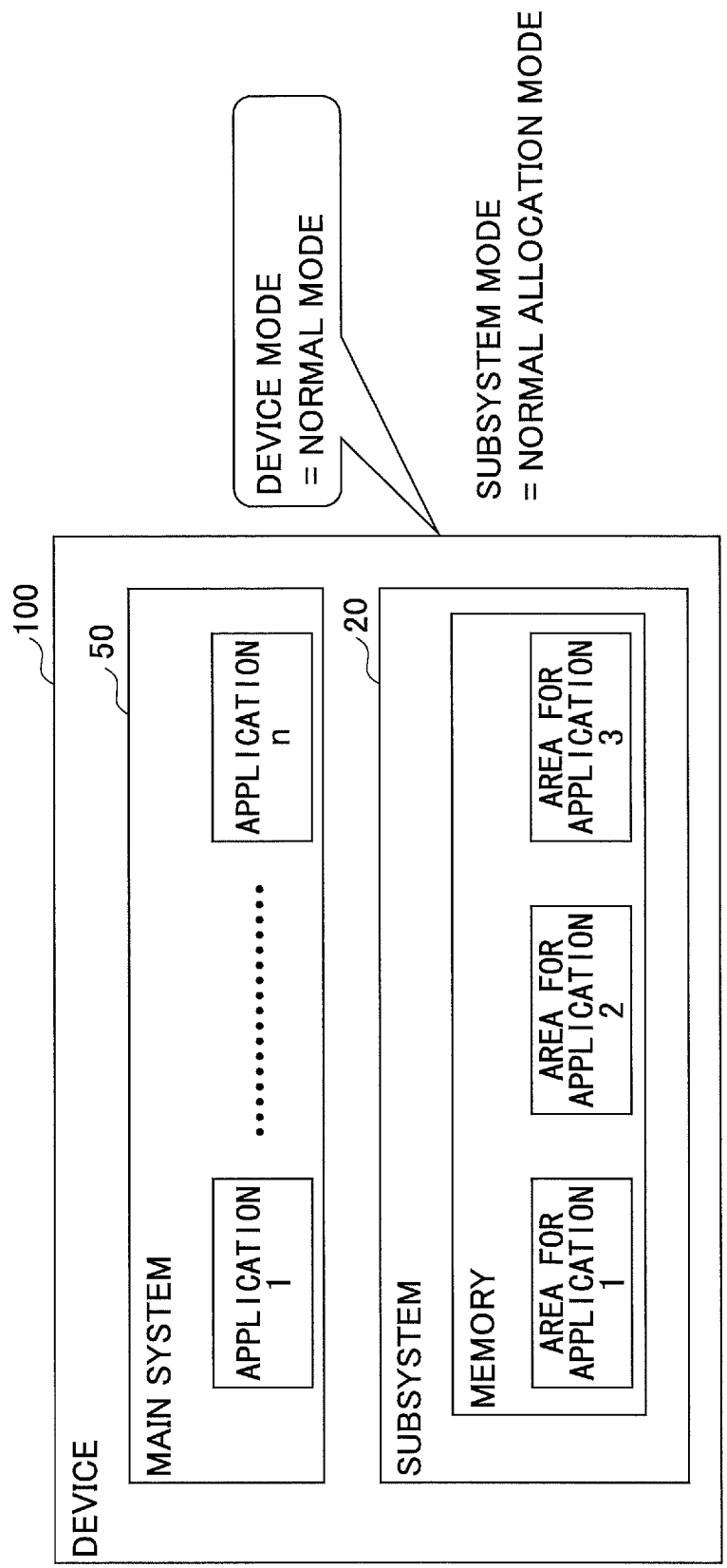

FIGS. 1A and 1B are diagrams schematically illustrating an example of a device including a subsystem. The device 100 includes a main system 50 and the subsystem 20. For applications 1 to n, the subsystem 20 reserves corresponding buffer areas in a memory.

The device 100 has a plurality of functions, and a plurality of device modes is defined for the device 100. The plurality of device modes can be categorized, depending on whether applications for the device mode process a large amount of data.

Normal mode: Each of the applications 1 to n may process corresponding suitable data.

Video projection mode: A large amount of data is processed, in order to receive video data.

Firmware update mode: A large amount of data is processed, in order to receive firmware.

Depending on the current device mode of the device 100, the subsystem 20 operates in a corresponding subsystem mode. The subsystem 20 determines sizes of buffer areas to be allocated to the applications 1 to n, depending on the subsystem mode.

FIG. 1A is a diagram illustrating an example of allocation of buffers, when the device mode is the normal mode. The subsystem mode corresponding to the normal mode is a normal allocation mode. During the normal allocation mode, predetermined buffer areas are allocated to the corresponding applications 1 to n, depending on sizes of data to be processed by the applications 1 to n. For example, a size of a buffer area allocated to the application 2 may be greater than those of the applications 1 and 3.

FIG. 1B is a diagram illustrating an example of allocation of a buffer, when the device mode is the firmware update mode. The subsystem mode corresponding to the firmware update mode is a single application allocation mode. Here, it is assumed that the firmware is to be updated for an application X. During the single application allocation mode, the application X occupies the buffer area. The subsystem 20 is to receive a large amount of data. By expanding the buffer area as much as possible, a communication destination device can transmit a large amount of data each time. Consequently, high-speed communication can be achieved.

As described above, even if the same application (i.e., the application X) is executed in the main system 50, the allocation of the buffer area of the subsystem 20 can be changed, depending on an amount of data to be processed by the device 100. For example, when the firmware of the application X is to be updated, the buffer area for the application X can be sufficiently expanded, as described above. Consequently, likelihood that the subsystem 20 becomes a bottleneck of the communication can be reduced.

[Configuration Example]

FIG. 2 is a schematic configuration diagram of an example of a network system 500. The network system 500 includes the device 100 according to the embodiment. The device 100 is connected to a communication device 200 through a network 300. The network 300 may be a local area network (LAN). Alternatively, the network 300 may be a wide area network (WAN) in which a plurality of LANs are connected through a router or the like. The WAN may be the Internet, for example. The network 300 may be a wireline network. Alternatively, a portion of or all the network 300 may be a wireless LAN (e.g., IEEE 802.11b/a/g/n). Alternatively, the network 300 may be a mobile communication network, such as a mobile phone network, a WiMAX network, or a PHS network. In the explanation below, examples of the case where the device 100 and the communication device 200 are connected through the network 300 include a case where the device 100 and the communication device 200 communicate in a peer-to-peer manner by an ad hoc mode of a wireless LAN.

The device 100 can execute an application that operates by communicating with the communication device 200. The device 100 is not particularly limited. However, the device 100 may be a projector, an image forming device, a video conference terminal, a mobile terminal, or a client terminal, for example. The projector may receive video data and/or image data, and the projector may project the received video data and/or image data. The image forming device includes an image forming function. The image forming device may be a copy machine, a scanner, a printer, or a facsimile machine, for example. The image forming device may include more than one of the functions of the above-described devices. The mobile terminal is a terminal device that can be carried by a user. The mobile terminal may be a mobile phone, a smart phone, a tablet terminal, a personal digital assistant (PDA), or a digital camera, for example. The client terminal is an information processing device that can be used by a user. The client terminal may be a laptop personal computer (PC), a desktop PC, or a workstation, for example.

The communication device 200 may be any one of the above-described devices that are listed as examples of the device 100. Alternatively, the communication device 200 may be an information processing device, such as a server device or a thin-client device. The communication device 200 transmits data to the device 100. Here, the data to be transmitted from the communication device 200 to the device 100 depends on a concrete combination between the device 100 and the communication device 200. For example, the communication device 200 may be a client terminal that transmits video data to a projector (i.e., an example of the device 100). Alternatively, the communication device 200 may be a client terminal that transmits print data to an image forming device (i.e., an example of the device 100). Alternatively, the communication device 200 may be a video conference terminal that transmits video data captured by a camera to another video conference terminal (i.e., an example of the device 100). Alternatively, the communication device 200 may be a server or a mobile terminal that transmits web data and/or audio data to another mobile terminal (i.e., an example of the device 100). Alternatively, the communication device 200 may be a server that transmits data for firmware update to various types of devices 100.

Figure 3A:
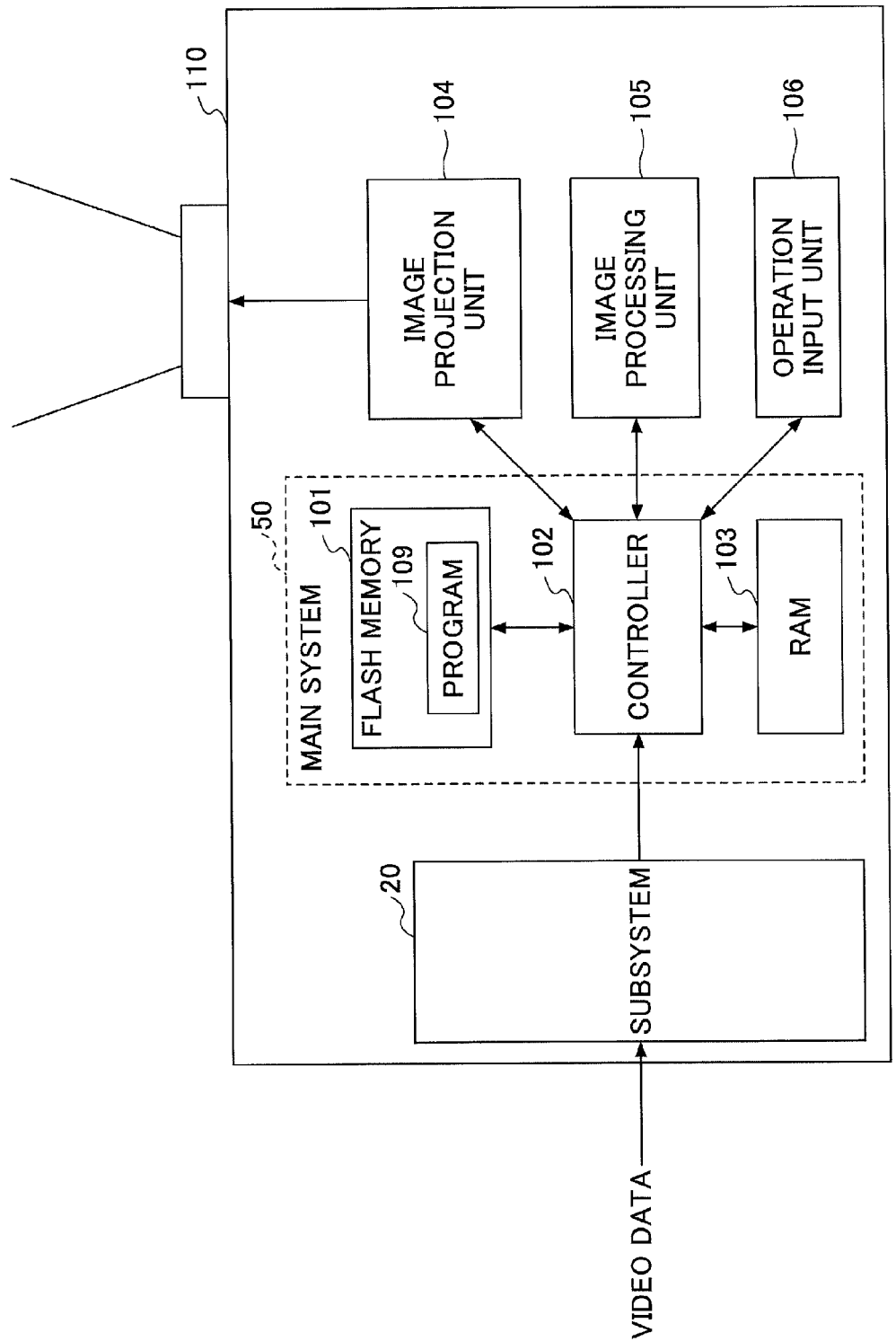
FIG. 3A is a block diagram of a projector.

FIG. 3A is a block diagram of an example of a projector 110. The projector 110 includes the subsystem 20 and the main system 50. The main system 50 includes a flash memory 101; a controller 102; and a random access memory (RAM) 103. The main system 50 is controlled by the controller 102. The projector 110 further includes an image projection unit 104; an image processing unit 105; and an operation input unit 106. The flash memory 101, the RAM 103, the image projection unit 104, the image processing unit 105, and the operation input unit 106 are connected to the controller 102.

The subsystem 20 can communicate with the communication device 200. The subsystem may receive video data from the communication device 200. The subsystem 20 is described later. Here, the video data to be received by the subsystem 20 may be digital data transmitted through a network (e.g., MPEG 2 data, WMV data, MP4 data, H.264 data, JPEG data, BMP data, GIF data, or PNG data). The projector 110 includes a function to project an image signal (e.g., an NTSC signal, a PAL signal, or a SECAM signal) that is transmitted through an interface, such as a D-sub connector, a BCN connector, or an HDMI connector.

The video data is input to the image processing unit 105 through the controller 102. The image processing unit 105 processes the video data so as to project a video image. For example, the image processing unit 105 may decode video data in accordance with a compression format. The image processing unit 105 may convert a resolution of video data into another resolution that is supported by the projector 110. The image processing unit 105 may decompose video data into a red video image component, a green video image component, and a blue video image component. The image processing unit 105 may emphasize or attenuate a predetermined color signal. The image processing unit 105 may process video data so as to emphasize sharpness of an outer boundary of an image.

The image projection unit 104 may include an optical device and/or an optical system, such as a liquid crystal display (LCD), a digital light processing (DLP) projector, or a liquid crystal on silicone (LCOS) display. The controller 102 projects projection data by reading out the projection data stored in the RAM 103 and by controlling the image projection unit 104. Here, the projection data is stored in the RAM 103 by the image processing unit 105.

The flash memory 101 stores firmware. The firmware includes a program 109 and various parameters, such as a color adjustment value. The program 109 may be stored in a computer readable recording medium in an installable format or in an executable format. The program 109 may be distributed by distributing such a computer readable recording medium. Alternatively or additionally, the program 109 (or the firmware) may be distributed by a server (not shown) as a file in an installable format or in an executable format.

The operation input unit 106 may be hard keys for receiving user operation, soft keys displayed on a touch-panel liquid crystal display, and/or an audio input device, for example.

FIG. 3B is a diagram showing an example of a hardware configuration of the communication device 200. The communication device 200 may include a CPU 201; a read-only memory (ROM) 202; a RAM 203; a hard disk drive (HDD) 204; a graphics add-in board 205 to which a display 220 is connected; keyboard and mouse 206; a media drive 207; and a network communication unit 208, which are connected to a bus.

The CPU 201 loads a program 210 that is stored in the HDD 204 into the RAM 203, and the CPU 201 executes the program 210. By doing this, the CPU 201 can control components of the communication device 200. In this manner, the CPU 201 can perform an input process and/or an output process, and the CPU 201 can process data. The ROM 202 stores a small program. The small program is for loading a Basic Input/Output System (BIOS) program and/or a bootstrap loader stored in the HDD 204 into the RAM 203. The bootstrap loader loads an operating system stored in the HDD 204 into the RAM 203.

The HDD 204 is not particularly limited, provided that the HDD 204 can function as a non-volatile memory. For example, a solid state drive (SSD) may be used instead of the HDD 204. The HDD 204 stores a device driver and the program 210. The program 210 is used for achieving necessary functions of the communication device 200. The display 220 displays a graphical user interface (GUI) screen. The GUI screen is created by the graphics add-in board 205 under control of the program 210.

The keyboard and mouse 206 is an input device for receiving user operation. The media drive 207 can read and write data in an optical disk, such as a compact disk (CD), a digital versatile disc (DVD), or a blu-ray disk (BD). Alternatively or additionally, the media drive 207 may read and write data in a memory card, such as a flash memory card. The network communication unit 208 may be an Ethernet (registered trademark) card for connecting to a LAN, for example. The OS and/or the program 210 executes the TCP/IP protocol (or the UDP/IP protocol) and/or an application layer protocol. There are many types of application layer protocols, such as a Simple Network Management Protocol (SNMP), a Hypertext Transfer Protocol (HTTP), a File Transfer Protocol (FTP), or a Server Message Block (SMB) protocol.

The program 210 may be stored in a computer readable storage medium in an installable format or in an executable format. The program 210 may be distributed by distributing such a computer readable storage medium. Alternatively or additionally, the program 210 may be distributed by a server (not shown) as a file in an installable format or in an executable format.

[Functional Configuration Example]

Figure 4:
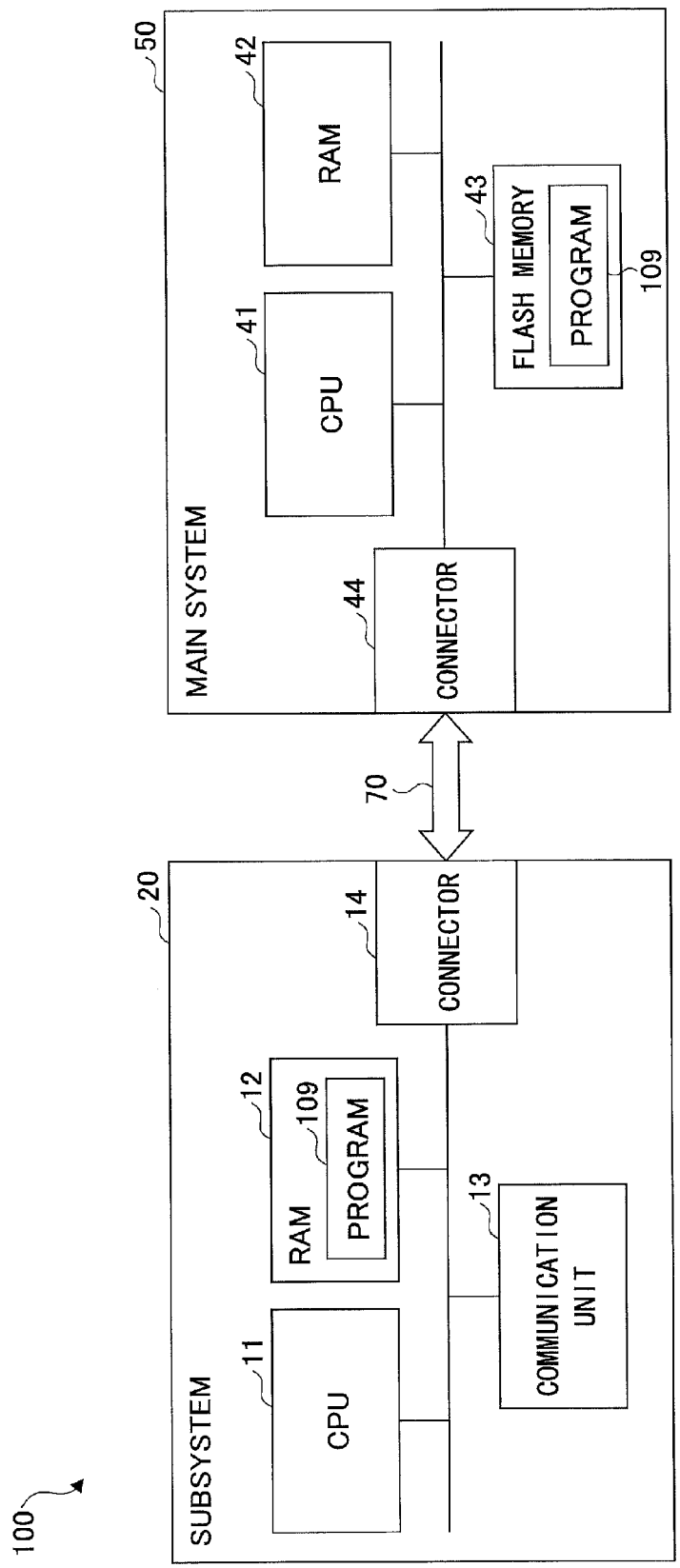
FIG. 4 is a diagram showing an example of configurations of a main system and the subsystem.

FIG. 4 is a diagram showing an example of configurations of the main system 50 and the subsystem 20. The main system 50 and the subsystem 20 are formed as separate devices. The main system 50 may include an application specific integrated circuit (ASIC), a field-programmable gate array (FPGA), and/or a system-on-chip (SoC). The subsystem 20 may include another ASIC, another FPGA, and/or another SoC. The main system 50 and the subsystem 20 are connected through a line 70.

The main system 50 includes a CPU 41; a RAM 42; a flash memory 43; and a connector 44, which are connected to a bus. In the example of FIG. 3A, the CPU 41 and the connector 44 are included in the controller 102.

The device 100 includes a main power supply (not shown). Even if the main power supply is turned on, when a time period during which no video data is received or a time period during which the operation input unit 106 does not receive any user operation exceeds a predetermined time period, an operation mode of the main system 50 switches to a power saving mode. During the power saving mode of the main system 50, while the RAM 42 keeps storing a program and/or data, a clock frequency of the CPU 41 is reduced and/or supply of power to the main system 50 is stopped, except for supply of power to a minimum circuit of the main system 50. When video data is received or the operation input unit 106 receives user operation, the main system 50 wakes up from the power saving mode, and the operation mode of the main system 50 returns to a normal operation mode.

Even if the operation mode of the main system 50 switches to the power saving mode, an operation mode of the subsystem 20 is not switched to a power saving mode. In this case, power consumption of the device 100 can be reduced because the operation mode of the main system 50 is switched to the power saving mode, and at the same time, the subsystem 20 can execute a process whose processing load is relatively small (e.g., a communication process).

The subsystem 20 includes a CPU 11; a RAM 12; a connector 14; and a communication unit 13. Each of the connector 14 of the subsystem 20 and the connector 44 of the main system 50 may be a communication connector, such as a universal serial bus (USB) connector, an IEEE 1394 connector, or a Serial ATA (SATA) connector. The connector 14 of the subsystem 20 and the connector 44 of the main system 50 are not particularly limited, provided that high-speed communication between the subsystem 20 and the main system 50 can be achieved. Instead of the wired connection, the subsystem 20 and the main system 50 may be connected wirelessly, so that the subsystem 20 and the main system 50 can wirelessly communicate with each other. The communication unit 13 may be a communication device that is the same as the network communication unit 208 of the communication device 200.

For example, when the device 100 is activated by turning on the main power supply, a part of the program 109 is transmitted from the main system 50 to the subsystem 20. The subsystem 20 includes a ROM (not shown). The ROM stores a program that loads the part of the program 109 that is received by the connector 14 in the RAM 12. After the part of the program 109 is loaded in the RAM 12, the subsystem 20 executes the part of the program 109. When the part of the program 109 is executed, the program 109 causes the subsystem 20 to achieve a function to communicate with the communication device 200, a function to transmit data to the main system 50, and a function to change sizes of buffer areas in the RAM 12 for the corresponding applications 1 to n. Here, the subsystem 20 may include a flash memory, for example. Instead of transmitting the part of the program 109 from the main system 50 to the subsystem 20, the flash memory included in the subsystem 20 may store the part of the program 109.

Figure 5:
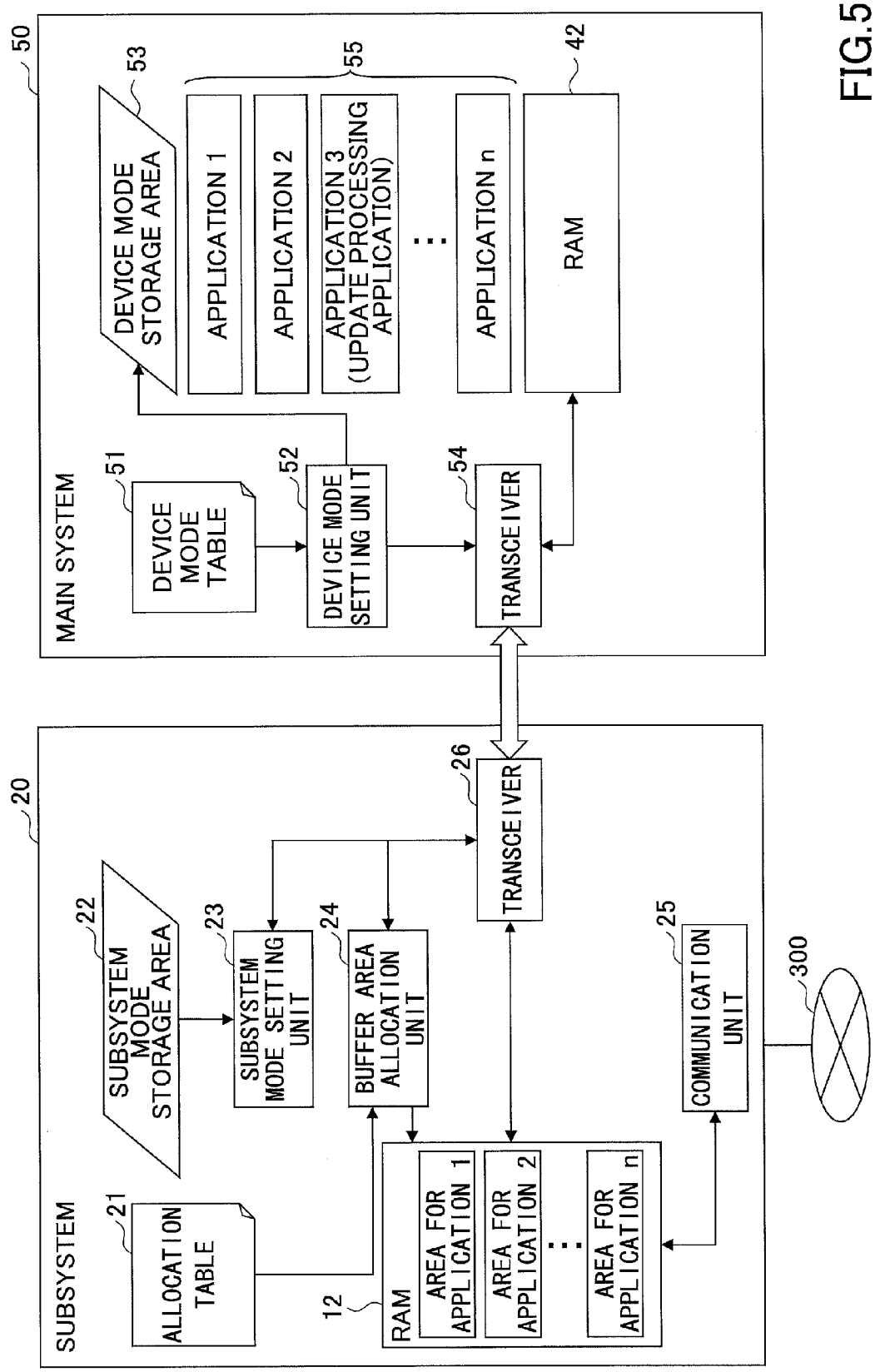
FIG. 5 is a functional block diagram showing an example of functional blocks of the main system and the subsystem.

FIG. 5 is a functional block diagram showing an example of functional blocks of the main system 50 and the subsystem 20.

[Main System]

The main system 50 includes an application 55; a transceiver 54; and a device mode storage area 53. The application 55 includes the applications 1 to n. In order to distinguish the applications 1 to n from one another, the application 55 is referred to as the applications 1 to n, hereinafter. The applications 1 to n are applications that cause the device 100 to achieve a specific function. For example, for the case of the projector 110, some of the applications 1 to n may correspond to an application for projecting an image, and an application for receiving projection brightness setting and magnification setting. For the case where the device 100 is the image forming device, some of the applications 1 to n may correspond to a copying application, a printing application, and a scanning application. The applications 1 to n may use corresponding areas of the RAM 42. Here, the capacity of the RAM 42 of the main system 50 is greater than that of the RAM 12 of the subsystem 20.

The device mode setting unit 52 determines a device mode, depending on an event that may be caused by user operation or control from the communication device 200, for example. The device mode setting unit 52 stores the determined device mode in the device mode storage area 53. The device mode storage area 53 stores the current device mode. The device mode is explained later by referring to FIG. 6A. Additionally, the device mode setting unit 52 may refer to the device mode table 51, and thereby the device mode setting unit 52 may determine a subsystem mode that is associated with the current device mode.

The transceiver 54 may receive data from the subsystem 20. The transceiver 54 may transmit a command to the subsystem 20. The transceiver 54 may receive various types of data depending on the type of the device 100, such as video data or print data. The transceiver 54 may receive firmware for updating. The transceiver 54 may transmit a message, such as a message for reporting the subsystem mode to the subsystem 20, or a message for reporting to the subsystem 20 that the operation mode of the main system 50 is switched to the power saving mode.

[Subsystem]

The subsystem 20 includes a subsystem mode setting unit 23; a subsystem mode storage area 22; a buffer area allocation unit 24; a communication unit 25; a transceiver 26; and an allocation table 21. The subsystem mode storage area 22 stores the subsystem mode that is most recently retrieved from the main system 50.

When the subsystem mode setting unit 23 receives the subsystem mode from the main system 50, the subsystem mode setting unit 23 determines as to whether the subsystem mode is switched, by comparing the received subsystem mode with the subsystem mode stored in the subsystem mode storage area 22.

The buffer area allocation unit 24 changes allocation of buffer areas to the applications 1 to n, depending on the subsystem mode. The allocation table 21 records methods of allocating the buffer areas. In the allocation table 21, each method is associated with a corresponding subsystem mode. The allocation table 21 is explained later by referring to FIG. 6A.

The transceiver 26 can transmit data to the main system 50, and receive a command from the main system 50. The transceiver 26 may receive data from the main system 50, and transmit a command to the main system 50. The communication unit 25 can be connected to the network 300. The communication unit 25 can execute a process defined by a communication protocol. The communication unit 25 can store data in the RAM 12. For example, in a TCP/IP-based session, a destination application of data received from the communication device 200 can be determined by a port number. The communication unit 25 may determine the destination application based on the port number, and the communication unit 25 may store the data in a buffer area that is allocated to the destination application. The transceiver 26 can detect that the communication unit 25 receives data. In such a case, the transceiver 26 may transmit the data stored in the RAM 12.

FIG. 6A is a diagram showing an example of the device mode table 51. Types of the device modes of the device 100 may include, for example, a normal mode, a video projection mode, and a firmware update mode. For each type of the device mode, a corresponding subsystem mode is defined. A subsystem mode is a name that specifies a method of allocating buffer areas. For example, for each device mode of the device 100, a designer may determine a corresponding subsystem mode by considering a size of data transmitted and/or received during the device mode. For example, a subsystem mode having a name of "normal allocation mode" may be associated with the normal mode of the device 100. A subsystem mode having a name of "single application allocation mode" may be associated with the video projection mode of the device 100. A subsystem mode having a name of "single application allocation mode" may be associated with the firmware update mode of the device 100.

FIG. 6B is a diagram showing an example of the allocation table 21. For the subsystem modes of a normal allocation mode and a single application allocation mode, corresponding concrete methods of allocating buffers are defined. For example, a size of a buffer area for transmission and a size of a buffer area for reception may be defined.

The method of allocating buffers that corresponds to the normal allocation mode is a buffer allocation method corresponding to the normal operation mode of the device 100. Accordingly, during the normal allocation mode, for the applications 1 to n, buffer areas that are suitable for the corresponding applications 1 to n to operate are reserved. In other words, sizes of the buffer areas for the corresponding applications 1 to n are defined by estimating sizes of data to be processed by the applications 1 to n. The method of allocating buffers that corresponds to the single application allocation mode is a buffer allocation method corresponding to a device mode of the device 100 during which a large amount of data may be received (e.g., the video projection mode, or the firmware update mode). Accordingly, during the single application allocation mode, a majority of the buffer area of the RAM 12 may be reserved for a single application X (X is any number from 1 to n) that processes the large amount of data.

[Operation Procedure]

Figure 7:
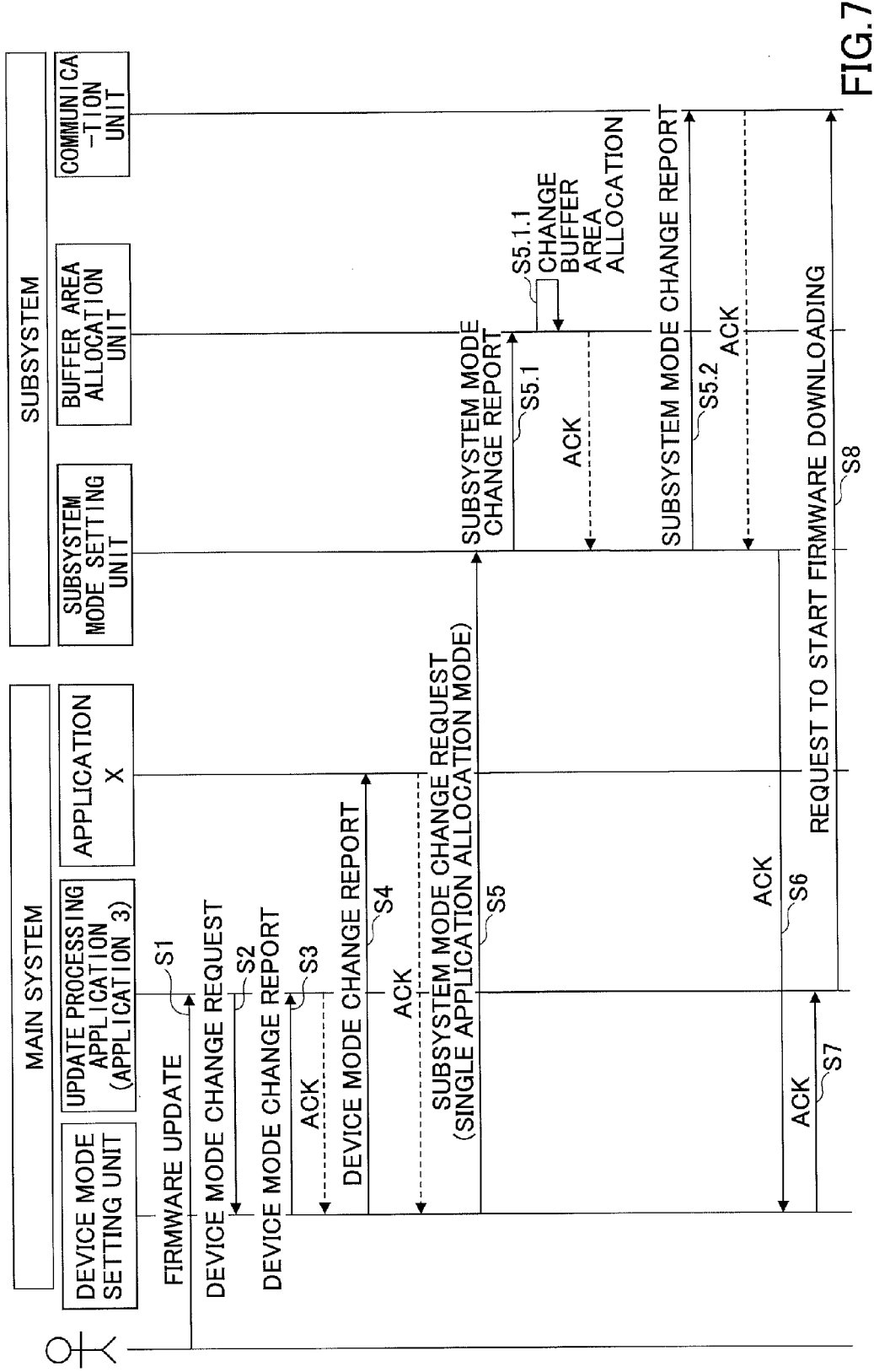
FIG. 7 is a flowchart illustrating an example of a procedure of the device for updating firmware by changing allocation of a buffer area.

FIG. 7 is a flowchart illustrating an example of a procedure of the device 100 to change allocation of buffer areas and update firmware. Here, a case is exemplified in which firmware is updated. The application that executes a procedure for updating the firmware is denoted as an update processing application. The update processing application is one of the applications 1 to n.

S1: In order to update firmware of an application X of the device 100, a user instructs an update processing application (e.g., the application 3) to update the firmware. The update processing application can execute a communication process. In particular, the update processing application receives the firmware.

S2: The update processing application queries the device mode setting unit 52 to change a device mode of the device 100 to be a device mode for updating the firmware. The update processing application receives an acknowledgement (ACK) or a non-acknowledgement (NACK) of the query from the device mode setting unit 52.

S3: The device mode setting unit 52 stores the device mode (i.e., the firmware update mode) in the device mode storage area 53, and the device mode setting unit 52 reports the change of the device mode to the update processing application. When the update processing application receives the report from the device mode setting unit 52, the update processing application sends an acknowledgement (ACK) to the device mode setting unit 52.

S4: The device mode setting unit 52 reports the change of the device mode to the application X for which the firmware is to be updated. When the application X receives the report from the device mode setting unit 52, the application X sends an acknowledgement (ACK) to the device mode setting unit 52.

S5: The device mode setting unit 52 may query the subsystem 20 to change the subsystem mode by reporting the subsystem mode (i.e., the single application allocation mode), only if the response to S3 is ACK and the response to S4 is ACK.

S5.1: The subsystem mode setting unit 23 receives the subsystem mode, and the subsystem mode setting unit 23 stores the received subsystem mode in the subsystem mode storage area 22. The subsystem mode setting unit 23 reports the change of the subsystem mode to the buffer area allocation unit 24.

S5.1.1: The buffer area allocation unit 24 changes allocation of buffer areas in the RAM 12 by referring to the allocation table 21. Then, the buffer area allocation unit 24 sends an acknowledgement (ACK) of the change to the subsystem mode setting unit 23.

S5.2: The subsystem mode setting unit 23 reports the change of the subsystem mode to the communication unit 25. When the communication unit 25 receives the report, the communication unit 25 sends an acknowledgement (ACK) of the reception.

S6: The subsystem mode setting unit 23 returns an acknowledgement (ACK) to the device mode setting unit 52 of the main system 50, only if the response from the buffer area allocation unit 24 is ACK and the response from the communication unit 25 is ACK.

S7: The device mode setting unit 52 sends an acknowledgement (ACK) to the update processing application so as to allow updating.

S8: The update processing application queries the communication unit 25 of the subsystem 20 to start downloading the firmware, depending on a content of the instruction to update the firmware by the user.

In this manner, the communication unit 25 receives the firmware from the communication device 200, and the communication unit 25 stores the received firmware in the reserved buffer area. For example, when the buffer area is filled with data, the transceiver 26 transmits the firmware to the main system 50. The update processing application updates the firmware of the application X in the flash memory 43.

Figure 8:
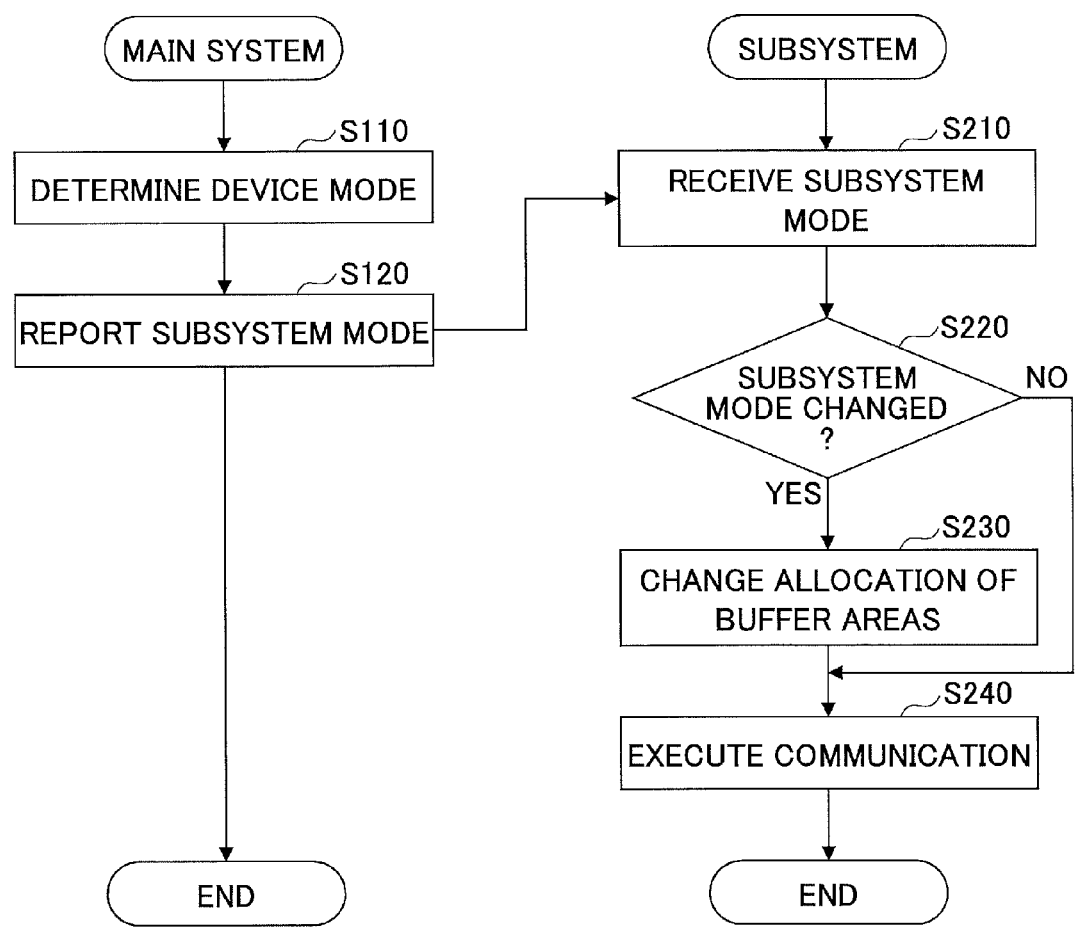
FIG. 8 is a flowchart showing a procedure of the subsystem for changing the buffer area.

FIG. 8 is a flowchart showing an example of a procedure of the subsystem 20 to change allocation of buffer areas. FIG. 8 mainly illustrates the process at step S5.1.1 of FIG. 7.

As described above, the device mode setting unit 52 of the main system 50 determines a device mode (S110).

The device mode setting unit 52 determines a subsystem mode by referring to the device mode table 51, and the device mode setting unit 52 reports the determined subsystem mode to the subsystem 20 (S120).

The transceiver 26 of the subsystem 20 receives the subsystem mode (S210).

The subsystem mode setting unit 23 determines whether the subsystem mode is changed (S220). That is because, when the reported subsystem mode is the same as the subsystem mode stored in the subsystem mode storage area 22, it may not be necessary to update the allocation of the buffer areas.

When a determination is made that the subsystem mode is changed (S220: Yes), the buffer area allocation unit 24 changes the allocation of the buffer areas (S230).

After that, the communication unit 25 starts communication (S240).

As described above, the network system 500 according to this example changes allocation of buffer areas of the subsystem 20, depending on a device mode. In other words, for each device mode, corresponding allocation of buffer areas can be optimized. When the subsystem 20 is to receive a large amount of data, the subsystem 20 can expand the corresponding buffer area as much as possible. Accordingly, even if capacity of the RAM 12 is small, the subsystem 20 may be prevented from being a bottleneck of the communication.

In the above explanation, the arrangement of the functions is for exemplifying purpose only. For example, the device mode table 51 may be included in the subsystem 20, and the allocation table 21 may be included in the main system 50. Additionally or alternatively, the device mode setting unit 52 may be included in the subsystem 20, and the subsystem mode setting unit 23 may be included in the main system 50. Additionally or alternatively, a part of the applications 1 to n may be included in the subsystem 20.

In the above-described example, allocation of buffer areas is changed for the case where the device 100 communicates with the communication device 200. Hereinafter, another example of the device 100 is explained. In this example, allocation of buffer areas is changed for a case where the main system 50 communicates with the subsystem 20.

The functional block diagram of this example of the device 100 is the same as the functional block diagram of FIG. 5. However, in this example, the configuration of the allocation table 21 is different. FIG. 9 is a diagram showing an example of the allocation table 21. In this example of the allocation table 21, for each subsystem mode, a size of a buffer area for internal communication is defined. In other words, the subsystem 20 includes a buffer area for storing data to be transmitted to the main system 50. In this example of the allocation table 21, the size of this buffer area of the subsystem 20 is defined.

In this example, data received by the communication unit 25 from a communication destination is stored in a buffer area of the subsystem 20. The data is transferred from the buffer area for the communication unit 25 to a buffer area for the internal communication.

Figure 10:
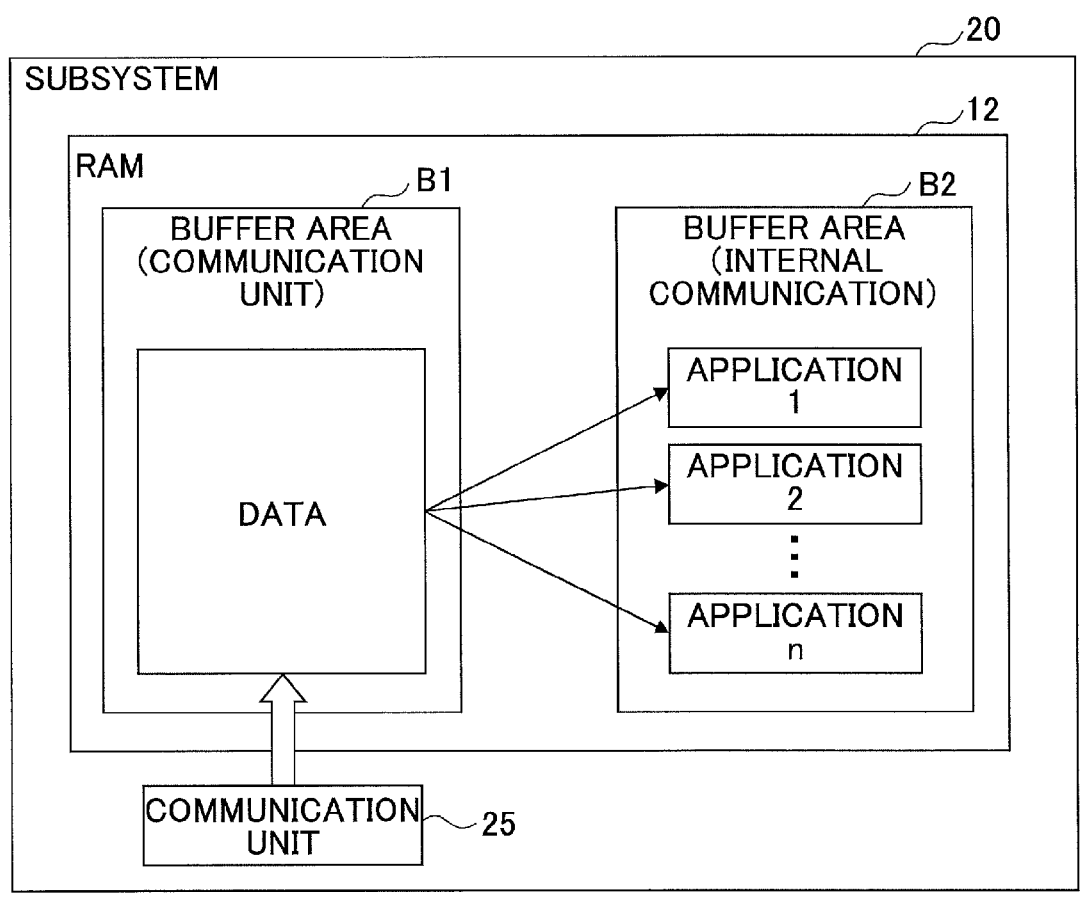
FIG. 10 is a schematic diagram illustrating an example of a configuration of a buffer area for a communication unit and a buffer area for internal communication.

FIG. 10 is a diagram schematically showing an example of a configuration of the buffer area for the communication unit 25 and an example of a configuration of the buffer area for the internal communication. Data received by the communication unit 25 is temporarily stored in the buffer area B1 for the communication unit 25. When an amount of the data stored in the buffer area B1 exceeds a predetermined amount, the data stored in the buffer area B1 is transferred from the buffer area B1 to the buffer area B2 for the internal communication by a direct memory access controller (DMAC), for example. Similar to the previous example, in the buffer area B1 for the communication unit 25, for each of a plurality of applications, a corresponding buffer area may be reserved.

As shown in FIG. 9, when the subsystem mode is the normal allocation mode, for the applications 1 to n, corresponding suitable buffer areas are reserved. When the subsystem mode is the single application allocation mode, majority of the buffer area B2 for the internal communication is reserved for the application X. During the single application allocation mode, the communication unit 25 may store a large amount of data in the buffer area B1 for the communication unit 25. However, the subsystem 20 may be prevented from being a bottleneck of the communication, and the subsystem 20 may suitably transmit data to the main system 50. That is because, during the single application allocation mode, relatively large portion of the buffer area B2 for the internal communication is reserved for the application X.

The above-described two examples of the configurations of the device 100 may be commonly applied to examples described below. Accordingly, in the following examples, the above-described two examples of the configurations of the device 100 may not particularly be distinguished.

In the above-described examples, a size of a buffer area reserved for an application other than the application to which the large buffer area is reserved may be decreased. Consequently, a communication rate of the application to which the small buffer area is reserved may be decreased. For a device that does not receive a large amount of data, such extreme allocation of buffer areas may not be preferable. Hereinafter, another example of the device 100 is explained. In the device 100 according to this example, a setting can be made as to whether or not to allow changing of allocation of buffer areas depending on a device mode.

Accordingly, for a device 100 that mainly executes network video playback, a setting may be made that allows changing of allocation of buffer areas depending on a device mode. In this case, when the device 100 is to play back video, the allocation of the buffer areas may be changed so as to expand the buffer area for the application that plays back the video. In this manner, the device 100 can successfully play back the video. For a device 100 other than the above-described device 100, a setting may be made that disallows changing of allocation of buffer areas depending on a device mode. In this case, allocation of buffer areas may be well-balanced among a plurality of applications. Accordingly, in the device 100, a plurality of functions can be simultaneously utilized.

Figure 11:
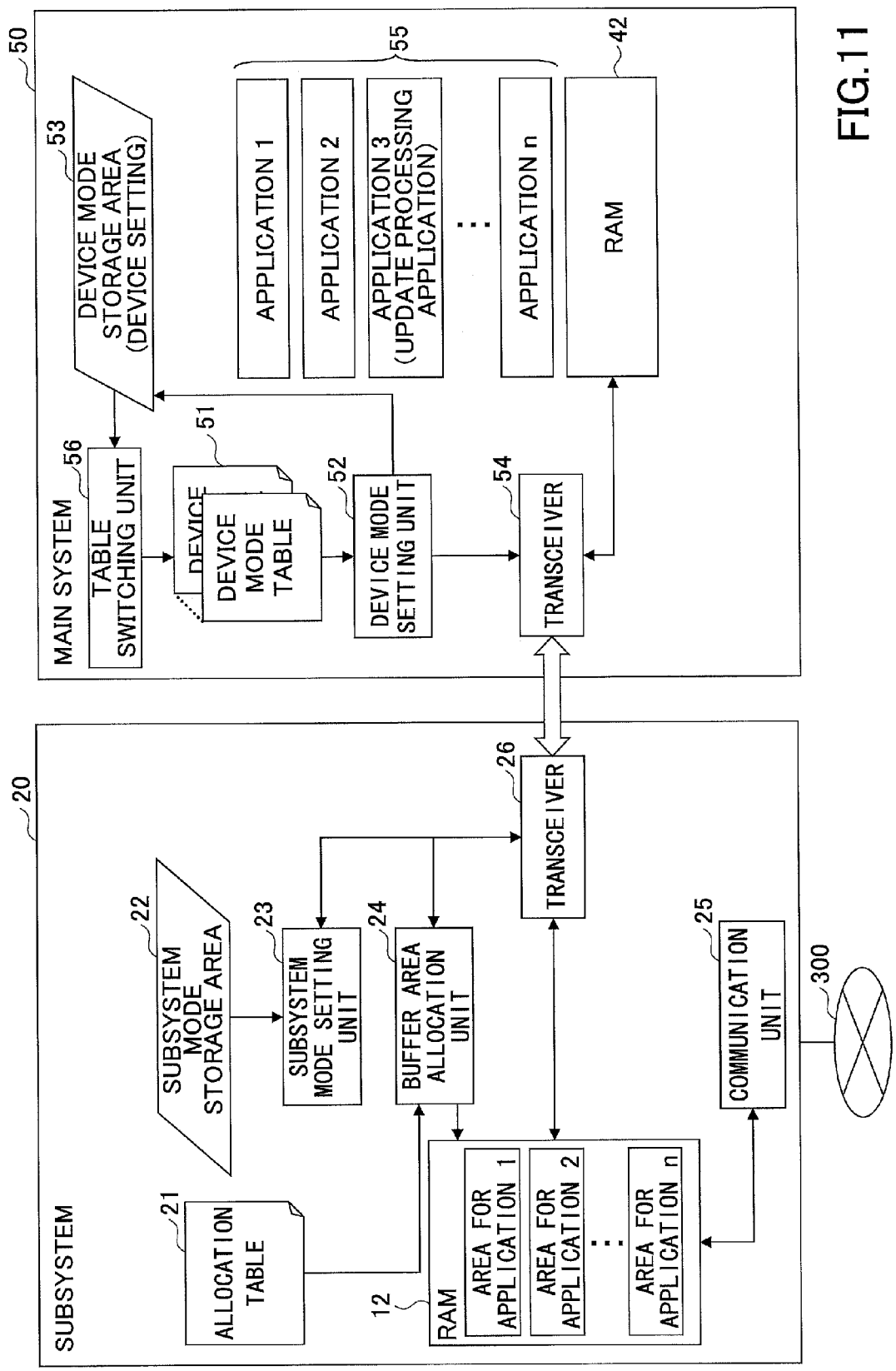
FIG. 11 is a functional block diagram illustrating another example of the main system and the subsystem.

FIG. 11 is a functional block diagram of an example of the main system 50 and an example of the subsystem 20. In this example, the functional elements having the same reference numerals as those of FIG. 5 have the same functions as explained above. Accordingly, duplicate explanation may be omitted for such functional elements, and main functional elements of this example are mainly explained. The main system 50 according to this example may include a plurality of device mode tables 51; and a table switching unit 56.

The table switching unit 56 can switch a device mode table 51 depending on a device setting. Here, a device setting may be defined to be a criterion (or a policy) for selecting a particular device mode table 51.

FIG. 12A is a diagram showing an example of device settings. FIG. 12A depicts two device settings. The device setting No. 1 may be "to speed up processing depending on an application," for example. The device setting No. 2 may be "recommended setting (default setting)," for example. Here, the device setting of "to speed up processing depending on an application" is a setting in which allocation of buffer areas may be suitably changed depending on a device mode, as described above. The device setting of "recommended setting (default setting)" is a setting in which allocation of buffer areas may be invariant, irrespective of a device mode.

FIG. 12B is a diagram showing device mode tables 51 corresponding to the device settings. The device mode table 51 corresponding to the device setting No. 1 of "to speed up processing depending on an application" is the same as the device mode table 51 of the previously explained example. The device mode table 51 corresponding to the device setting No. 2 of "recommended setting (default setting)" is a table in which the normal allocation mode is associated with all the device modes, irrespective of a type of the device mode.

By switching the device mode table 51 depending on a current device setting, a setting may be made as to whether changing of allocation of buffer areas depending on a device mode is allowed or not.

Here, a plurality of device settings may be defined in the device 100 in advance. Alternatively or additionally, a device setting may be selected and/or altered by user operation or by administrator operation. Alternatively or additionally, a device setting may be selected and/or altered by the communication device 200. When a device setting is selected, the device 100 stores the selected device setting in the device mode storage area 53, and the table switching unit 56 selects the device mode table 51 corresponding to the selected device setting.

Figure 13:
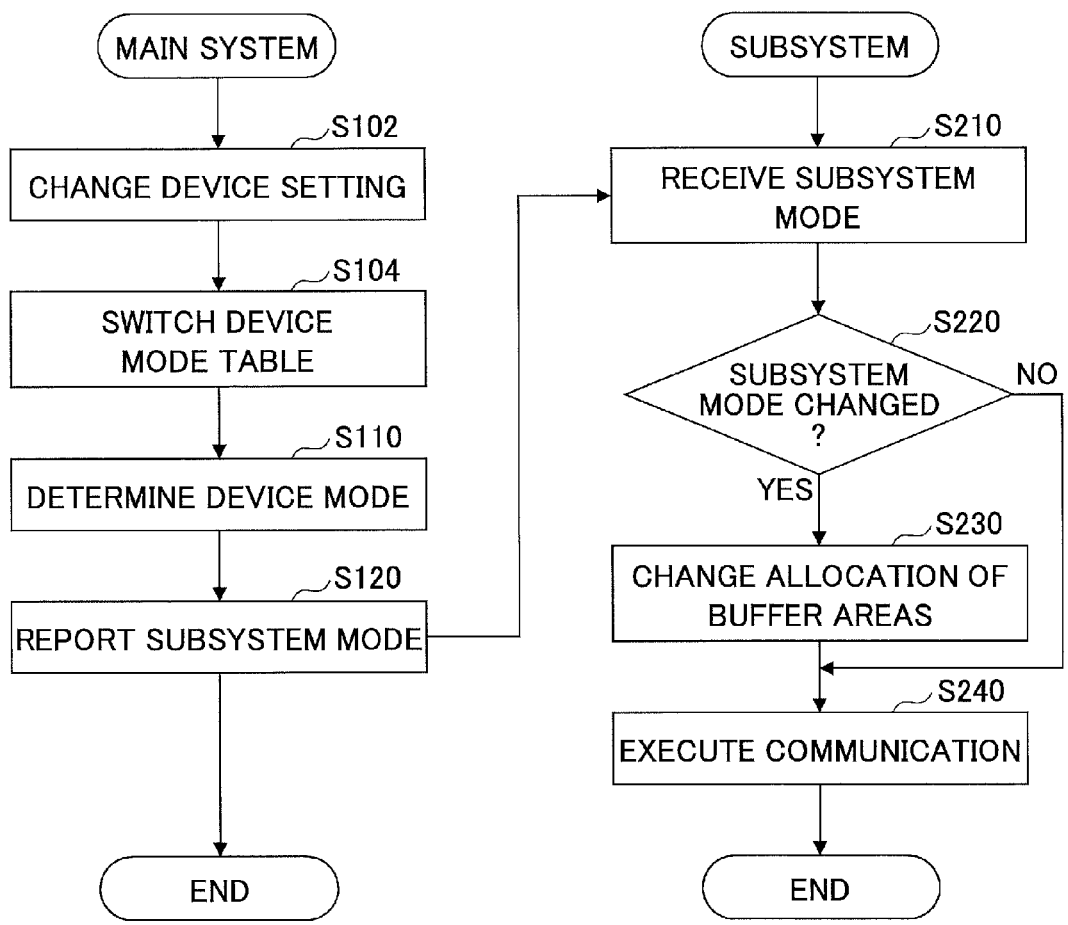
FIG. 13 is a flowchart showing an example of a procedure of the subsystem for changing the allocation of the buffer area.

FIG. 13 is a flowchart showing an example of a procedure of the subsystem 20 to change allocation of buffer areas.

For example, a user alters the device setting (S102).

The table switching unit 56 switches the device mode table 51, depending on the altered device setting (S104).

The main system 50 determines a device mode (S110).

The device mode setting unit 52 determines a subsystem mode corresponding to the determined device mode by referring to the device mode table 51, and the device mode setting unit 52 reports the determined subsystem mode to the subsystem 20 (S120).

The subsequent processes are the same as those of the previous examples. In this manner, the subsystem 20 can change allocation of buffer areas, depending on a device setting.

As described above, the device 100 according to this example can switch the device mode table 51, depending on a device setting. Accordingly, for the device 100, a setting can be made as to whether or not to allow changing of allocation of buffer areas depending on a device mode. For example, only for the device 100 in which processing speed is to be increased for an application whose communication load is large (e.g., a firmware download application, or a network video playback application), a setting may be made that allows changing of allocation of buffer areas, depending on a device mode.

In the above-described example of the device 100, the device mode table 51 is switched. Hereinafter, another example of the device 100 is explained. In the device 100 according to this example, the subsystem 20 may include a plurality of allocation tables 21. In the device 100, the allocation table 21 is switched, depending on a current subsystem buffer setting of the subsystem 20. With such a configuration, the device 100 according to this example may demonstrate the same advantage as that of the previous example.

Figure 14:
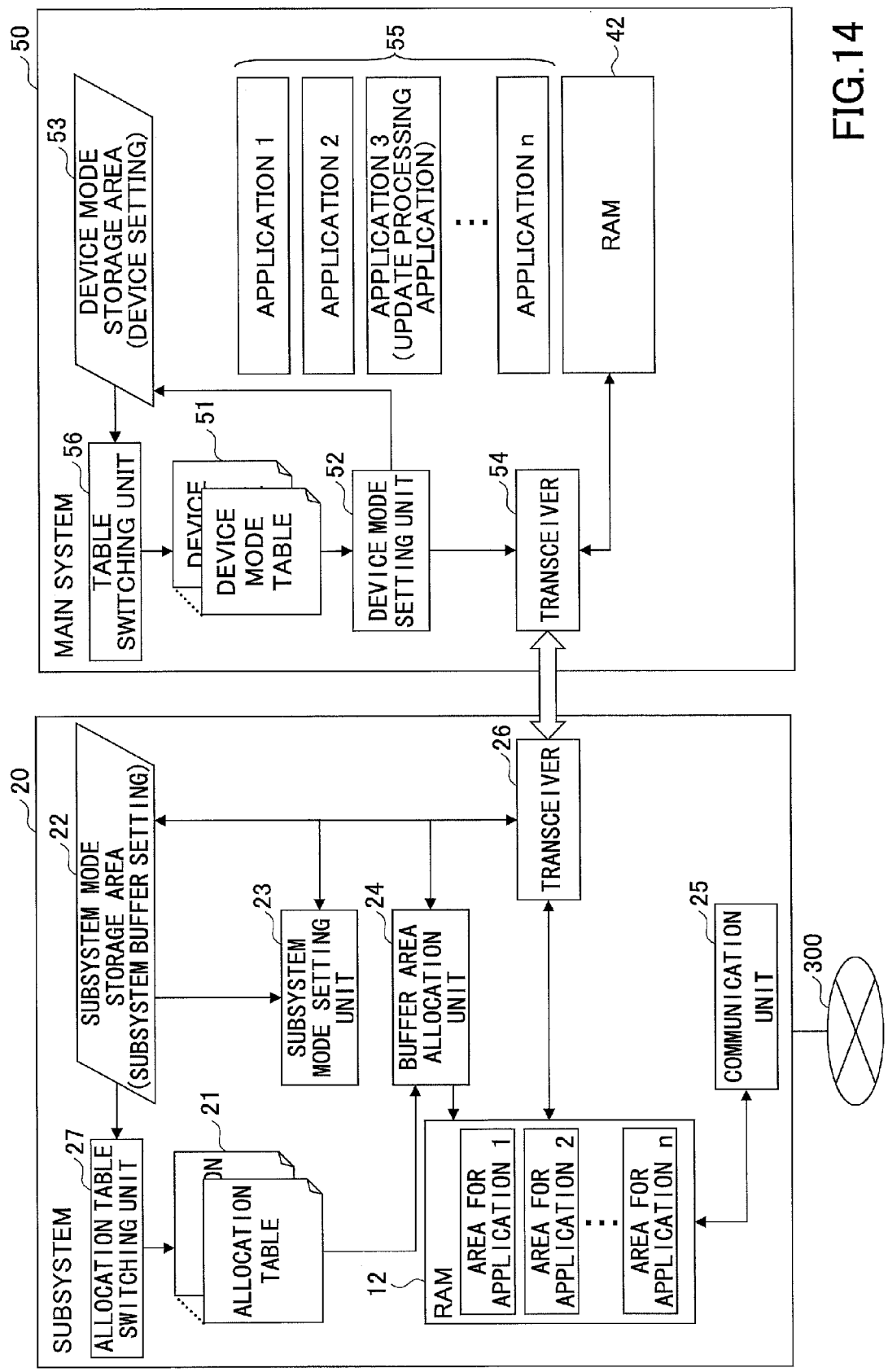
FIG. 14 is a functional block diagram of another example of the main system and the subsystem.

FIG. 14 is a functional block diagram of an example of the main system 50 and an example of the subsystem 20. The subsystem 20 according to this example may include a plurality of allocation tables 21; and an allocation table switching unit 27. The allocation table switching unit 27 switches the allocation table 21, depending on a subsystem buffer setting. Here, a subsystem buffer setting may be defined to be a criterion (a policy) for selecting a particular allocation table 21.

FIG. 15A is a diagram showing an example of the subsystem buffer settings. In FIG. 15A, two subsystem buffer settings are depicted. The subsystem buffer setting No. 1 is "balance prioritized setting." The subsystem buffer setting No. 2 is "speed prioritized setting." The subsystem buffer setting of "balance prioritized setting" is a criterion (a policy) such that, for each of the device modes, buffer areas are allocated to the applications 1 to n in a well-balanced manner (i.e., a particular application may not be extremely prioritized for reserving a corresponding buffer area). The subsystem buffer setting of "speed prioritized setting" is a criterion (a policy) such that, for each of the device modes, a buffer area is allocated to a corresponding particular application, so that the communication rate of the corresponding particular application becomes the highest.

FIG. 15B is a diagram showing an example of allocation tables 21 corresponding to the subsystem buffer settings. In the allocation table 21 corresponding to the subsystem buffer setting No. 1 of "balance prioritized setting," buffer areas may be evenly allocated to the applications 1 to n for the normal allocation mode. For the single application mode, approximately a half of the total buffer area may be allocated to the application X.

In the allocation table 21 corresponding to the subsystem buffer setting No. 2 of "speed prioritized setting," for the applications 1 to n, corresponding different sizes of buffer areas (considering amounts of data to be processed) may be allocated in the normal allocation mode. For the single application allocation mode, the whole buffer area may be allocated to the application X.

Accordingly, the allocation table 21 is switched, depending on a current subsystem buffer setting. Consequently, the method of allocating buffer areas can be changed, depending on a subsystem buffer setting.

Here, a plurality of subsystem buffer settings may be defined in the device 100 in advance. Alternatively or additionally, a subsystem buffer setting may be selected and/or altered by user operation. Alternatively or additionally, a subsystem buffer setting may be selected and/or altered by the communication device 200. When a subsystem buffer setting is selected for the device 100, the transceiver 54 transmits the selected subsystem buffer setting to the transceiver 26, and the subsystem 20 stores the received subsystem buffer setting in the subsystem mode storage area 22. The allocation table switching unit 27 switches the allocation table 21, depending on the selected subsystem buffer setting.

The example of the configuration of the device 100 shown in FIG. 14 is based on the example of the configuration of the device 100 shown in FIG. 11. In this example, the subsystem 20 may determine as to whether extreme allocation of buffer areas may be made. Accordingly, the main system 50 may not switch the device mode table 51. However, when the main system 50 switches the device mode table 51 depending on a device setting, a subsystem mode to be selected for a device mode after the device mode table 51 is switched may be different from a subsystem mode to be selected for the same device mode prior to switching the device mode table 51. Additionally, the subsystem 20 may switch the allocation table 21 depending on a subsystem buffer setting. Thus, finer allocation of buffer areas can be made. Namely, allocation of buffer areas can further be optimized, depending on a combination of a device setting and a subsystem buffer setting.

Figure 16:
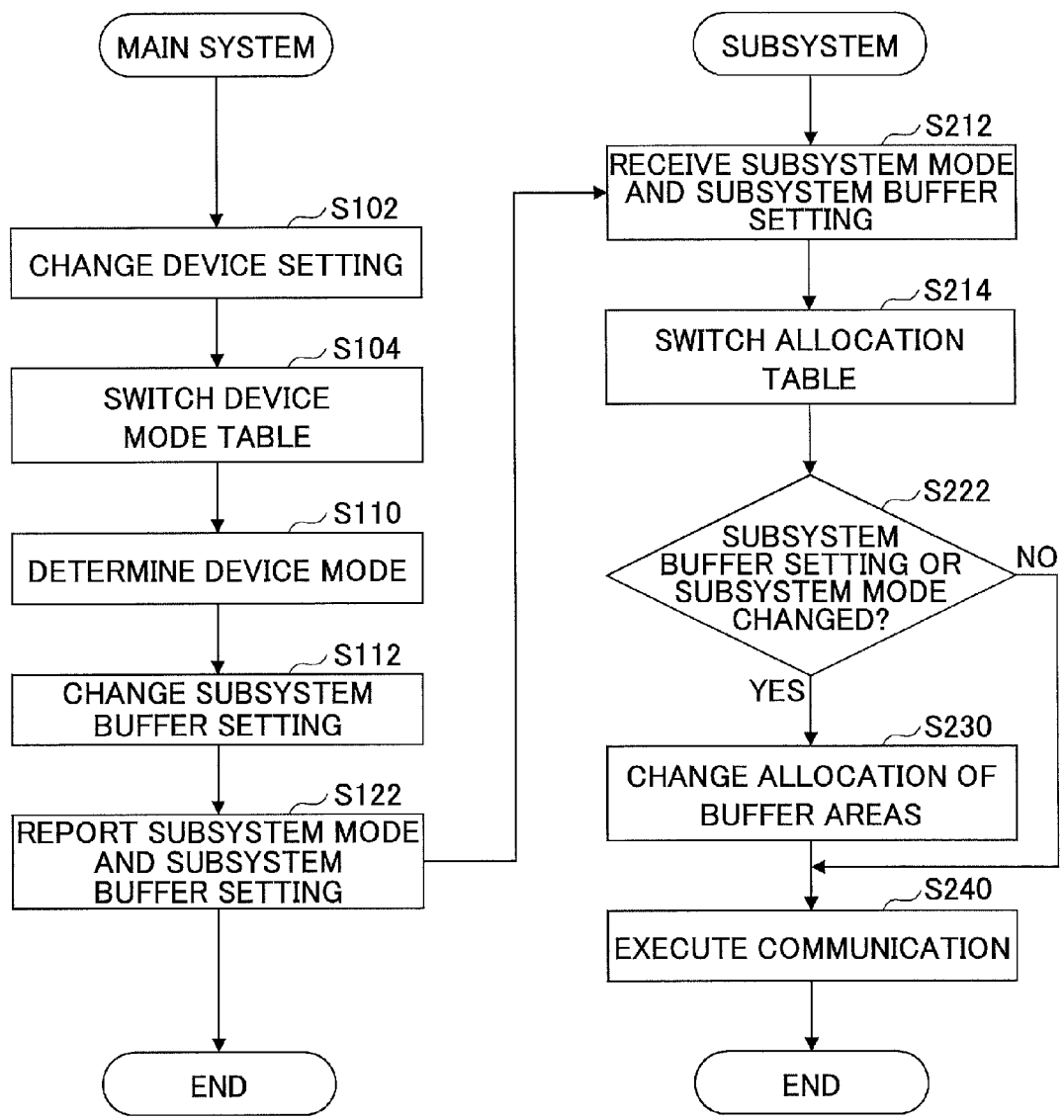
FIG. 16 is a flowchart showing another example of the procedure of the subsystem for changing the allocation of the buffer area.

FIG. 16 is a flowchart showing an example of a procedure of the subsystem 20 to change allocation of buffer areas. The steps S102, S104, and S110 are the same as those of FIG. 13. After determining the device mode at step S110, the subsystem buffer setting is changed (S112).

The main system 50 reports the changed subsystem mode and the subsystem buffer setting to the subsystem (S120).

The subsystem 20 receives the subsystem mode and the subsystem buffer setting (S212).

The allocation table switching unit 27 switches the allocation table 21 depending on the subsystem buffer setting (S214).

The subsystem mode setting unit 23 determines whether the device mode or the subsystem buffer setting is changed (S222).

When at least one of the device mode and the subsystem buffer setting is changed (S222: Yes), the buffer area allocation unit 24 changes allocation of buffer areas (S230).

After that, the communication unit 25 starts communication (S240).

As described above, the device 100 according to this example switches the allocation table 21 depending on the subsystem buffer setting. Accordingly, allocation of buffer areas can be optimized for the device 100, regardless of the subsystem mode selected by the device 100.

Hereinafter, an example of the network system 500 is explained. The network system 500 according to this example selects a a device setting, depending on a logged-in user.

In the above explanations, it is explained that a user may set the device setting. Once a user sets the device setting, that user may prefer using the same device setting after that. For such a case, operability of the device 100 may be enhanced by a setting such that the same device setting can be automatically set, without user's resetting. For example, allocation of buffer areas may be changed only for a user who wishes to increase processing speed of an application whose communication load is large.

Figure 17:
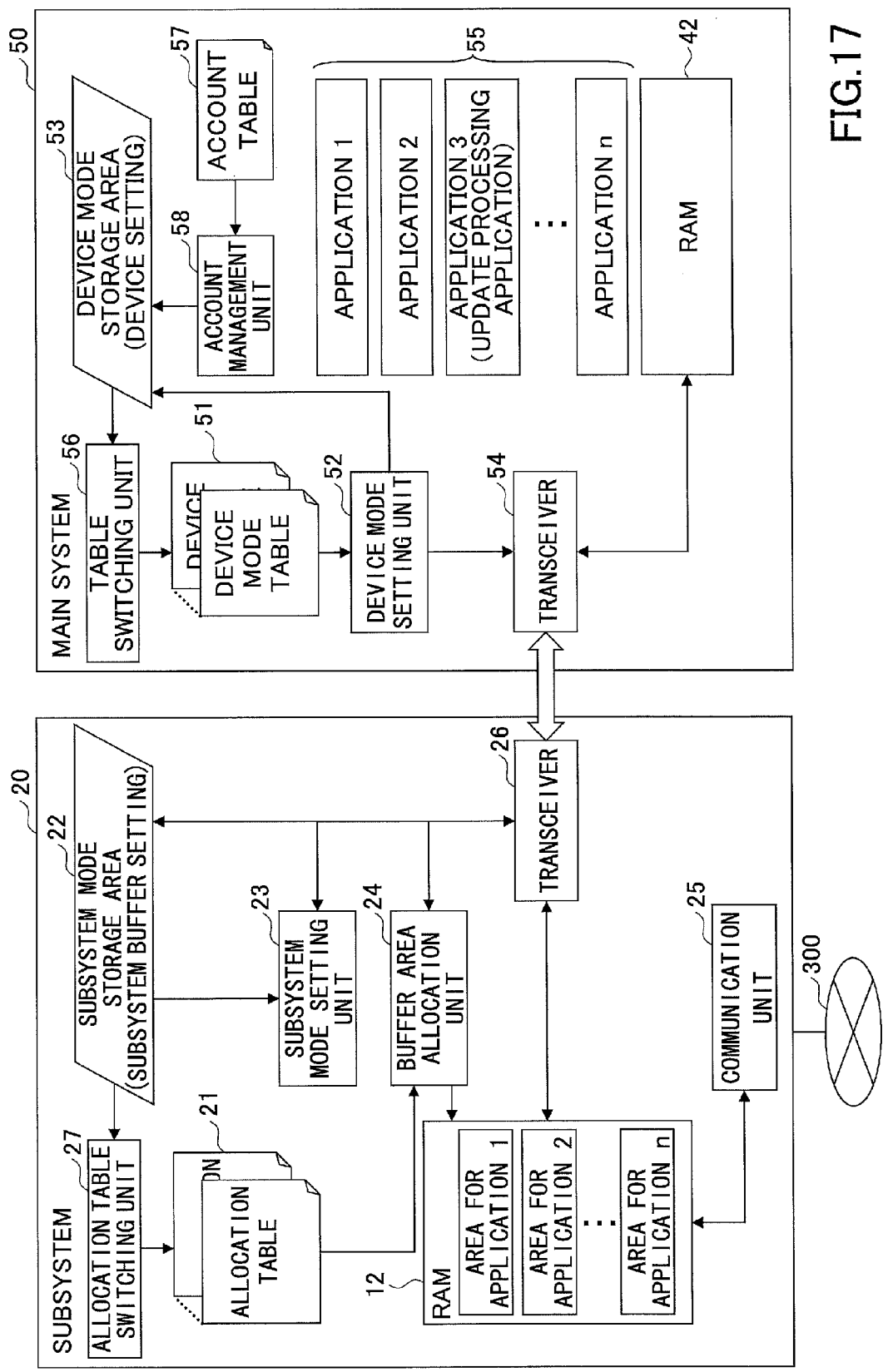
FIG. 17 is a functional block diagram of another example of the main system and the subsystem.

FIG. 17 is a functional block diagram of an example of the main system 50 and an example of the subsystem 20. The main system 50 according to this example may include an account management unit 58 and an account table 57. In the account table 57, for each of accounts (users), a corresponding device setting is recorded.

FIG. 18 is a diagram showing an example of the account table 57. For each of the accounts (the users), the corresponding device setting is recorded. In this example of the device 100, an account is identified by a user name that is input during log in. The account management unit 58 identifies the device setting in the account table 57 by using the account that is identified by the user name. The account management unit 58 stores the device setting in the device mode storage area 53. The table switching unit 56 switches the device mode table 51 depending on the stored device setting.

The device 100 according to this example is advantageous in the following point, in addition to the advantages described above. Namely, in the device 100 according to this example, a device setting can be automatically selected depending on a logged-in user. Consequently, allocation of buffer areas may be changed only for a user who wishes to increase processing speed of an application whose communication load is large, without any user operation.

Figure 19:
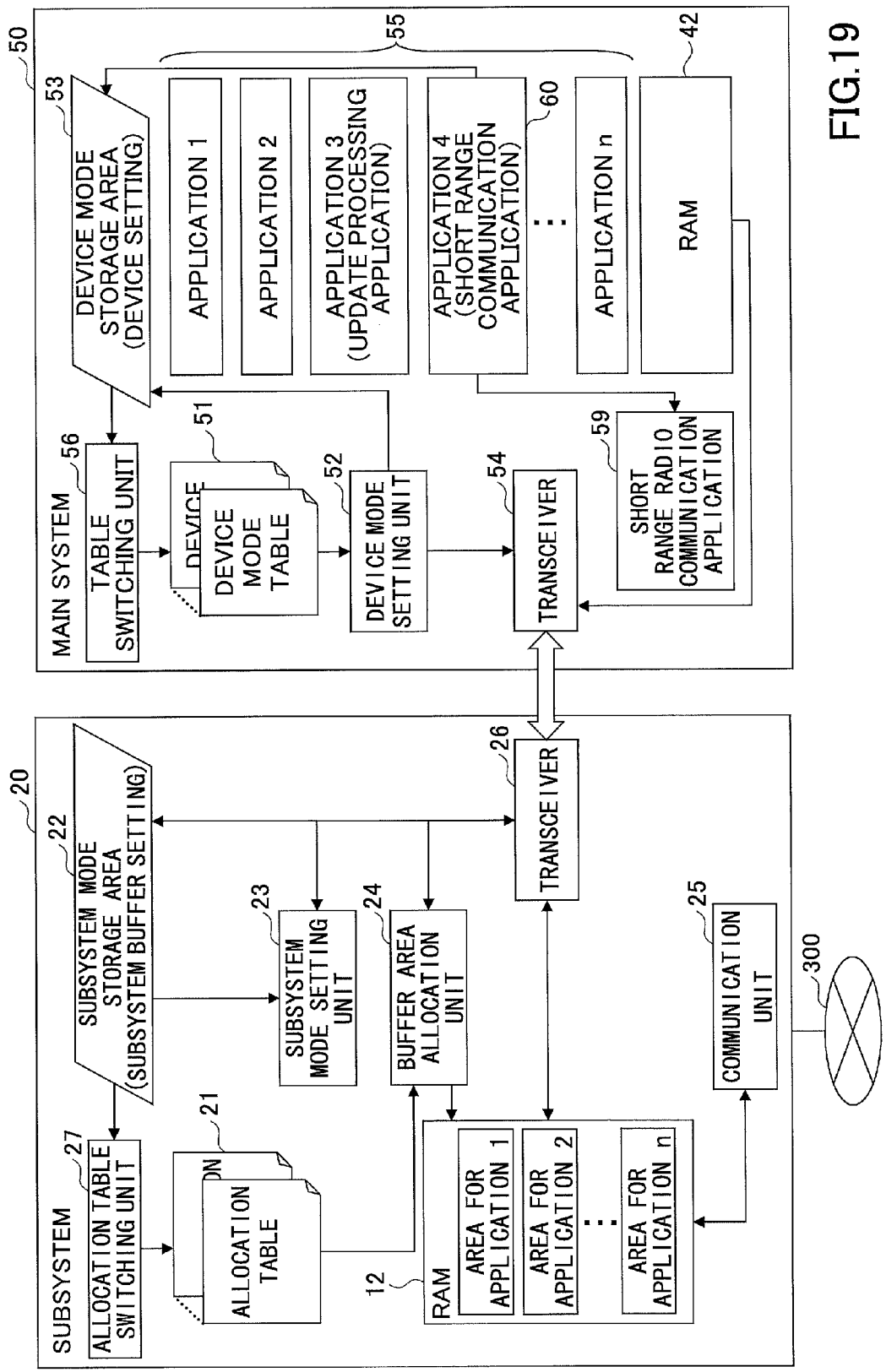
FIG. 19 is a diagram showing another example of the configurations of the main system and the subsystem.

Hereinafter, another example of the device 100 is explained. The device 100 according to this example may include a shot range radio communication unit. FIG. 19 is a diagram showing an example of a configuration of the main system 50 and an example of a configuration of the subsystem 20. The main system 50 according to this example may include a shot range radio communication unit 59; and an application 4 (a short range communication application 60). The short range radio communication unit 59 is a communication device that can perform communication in a relatively short distance (several tens of meters). The short range radio communication unit 59 may be a communication device conforming to a standard, such as Near Field Communication (NFC, a registered trade mark) standard, Bluetooth (a registered trade mark) standard, a wireless LAN standard, or ZigBee (a registered trade mark) standard. In many cases, the term "short distance" is used relative to long distance radio communication, such as radio communication based on a mobile telephone network.

The short range communication application 60 is an application corresponding to the short range radio communication unit 59. The short range communication application 60 may execute a communication process, when the short range radio communication unit 59 performs communication. Additionally, the short range communication application 60 may change a device setting to be a device setting that is suitable for the short range radio communication unit 59 to perform communication, and the short range communication application 60 may store the changed device setting in the device mode storage area 53. The table switching unit 56 may switch the device mode table 51, depending on the current device setting.

The short range radio communication unit 59 may start communication only by approaching a device capable of short range radio communication to the short range radio communication unit 59. Accordingly, only by approaching a terminal (e.g., a dongle including a NFC compliant radio unit) to the device 100 by a user, or approaching the device 100 to the terminal, the short range communication application 60 may change the device setting.

Accordingly, a user may set an optimized device setting to the device 100, and allocate buffer areas depending on a device mode, through simple operation.

Figure 20A:
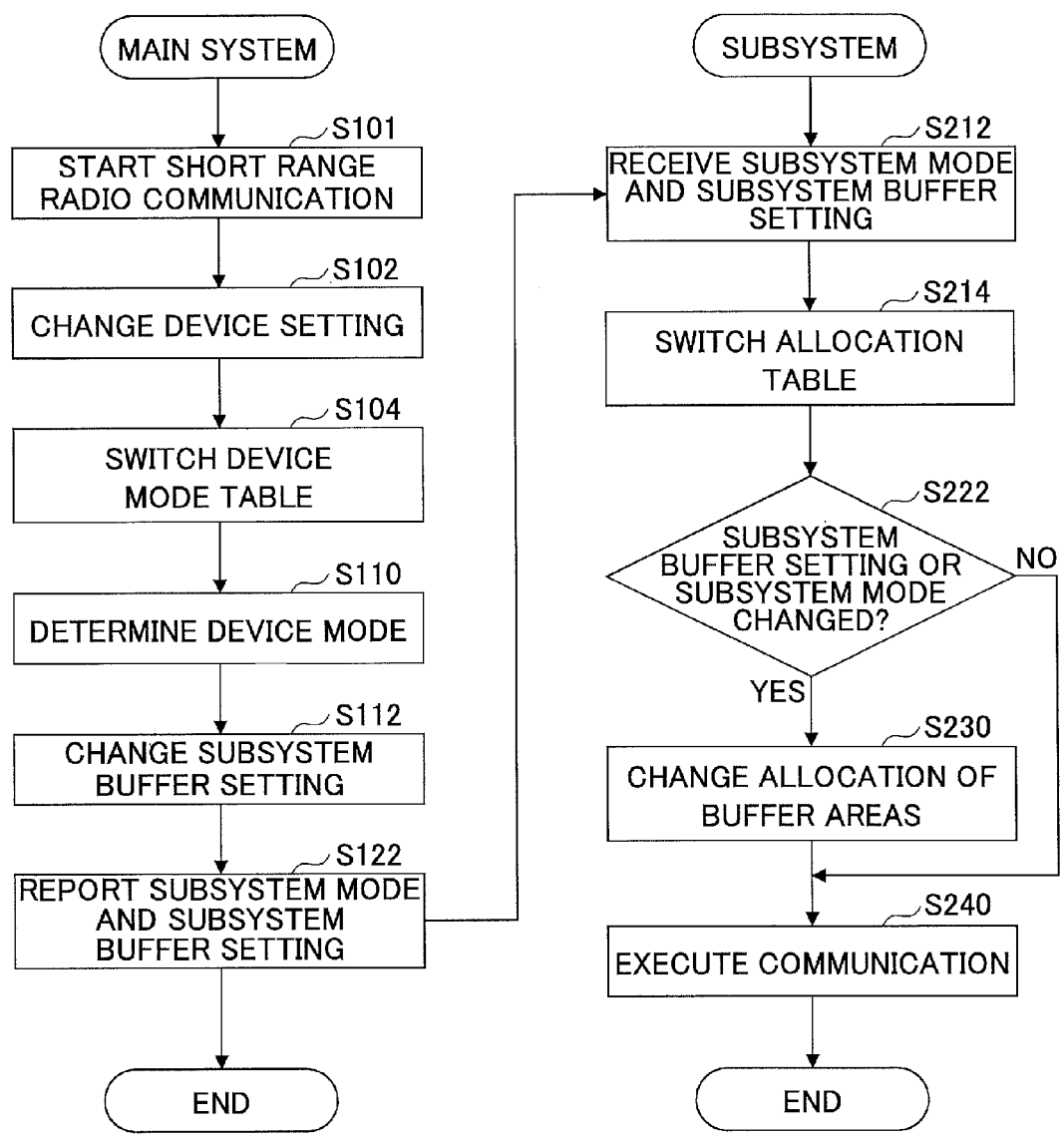
FIG. 20A is a flowchart showing an example of the procedure of the subsystem for changing the allocation of the buffer area.

FIG. 20A is a flowchart showing an example of a procedure of the subsystem 20 to change allocation of buffer areas.

The device 100 starts short range radio communication (S101).

Then, the short range communication application 60 changes the device setting (S102).

The table switching unit 56 switches the device mode table 51 depending on the changed device setting (S104).

The main system 50 determined the device mode (S110).

The subsystem buffer setting may be changed depending on necessity (S112).

The main system 50 reports the changed subsystem mode and the changed subsystem buffer mode to the subsystem 20 (S122). The subsequent processes are the same as those of FIG. 16.

In this example, the shot range communication application 60 changes the device setting. Alternatively, the short range communication application 60 may change the subsystem buffer setting.

Figure 20B:
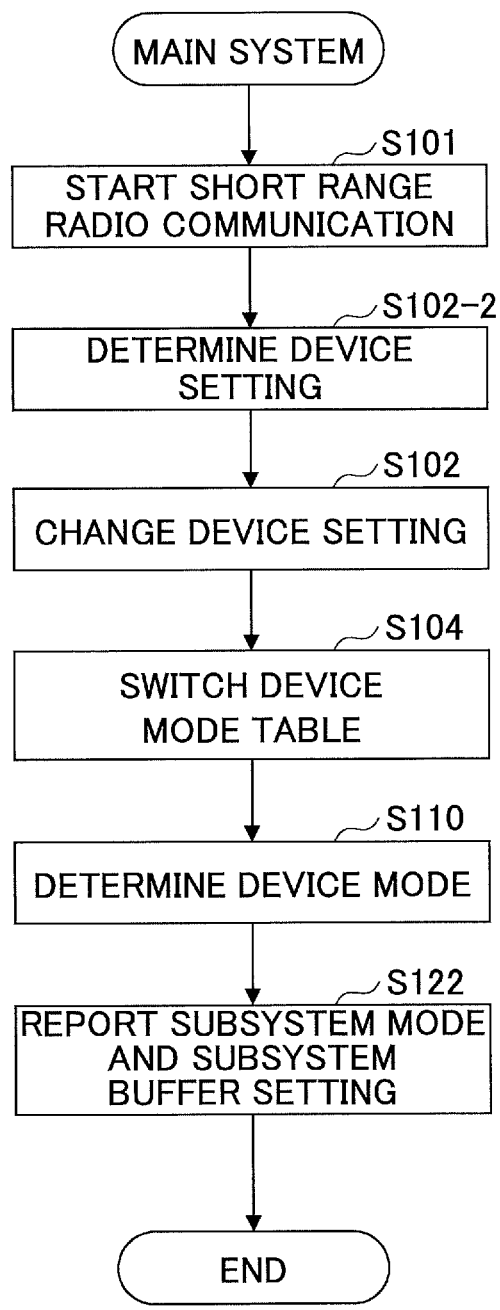
FIG. 20B is a flowchart showing an example of an operation procedure of the main system during change of the criterion for selecting the allocation table.

FIG. 20B is a flowchart showing an example of a procedure by the main system 50 when the subsystem buffer setting is changed. In FIG. 20B, the short range communication application 60 determines the subsystem buffer setting at step S102-2.

A user or the like changes the device setting in the device mode storage area (S102).

The table switching unit 56 switches the device mode table 51, depending on the changed device setting (S104).

The main system 50 determines the device mode (S110).

The main system 50 reports the changed subsystem mode and the changed subsystem buffer setting to the subsystem 20 (S122).

In this manner, the subsystem buffer setting is stored in the subsystem mode storage area 22 of the subsystem 20. Accordingly, the allocation table switching unit 27 can switch the allocation table 21.

In this example, the device 100 may include the short range communication unit 59. With such a configuration, a user can switch the device setting and/or the subsystem buffer setting, and allocate buffer areas by simple operation.

Hereinafter, another example of the device 100 is explained. The device 100 according to this example may include a mode display unit that visually indicates a current communication state.

Figure 21:
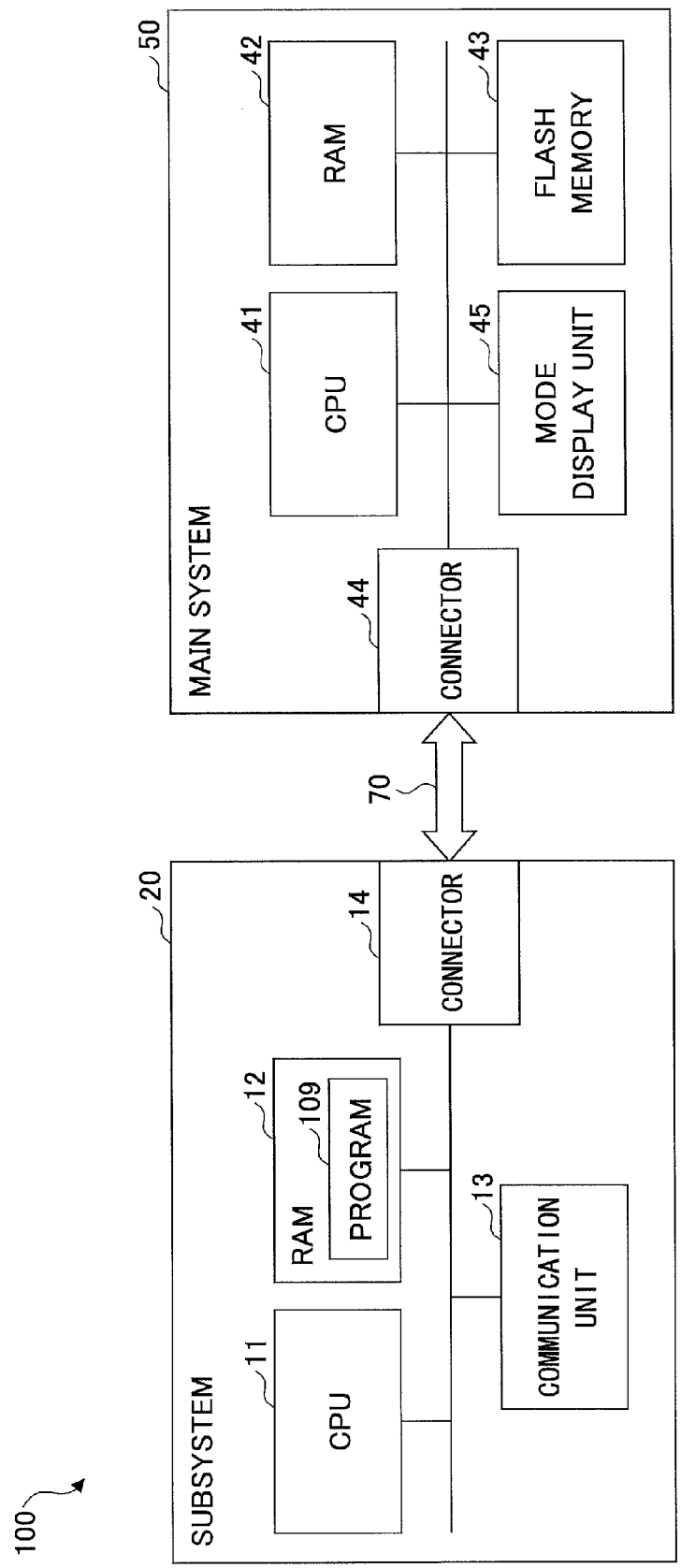
FIG. 21 is a diagram showing another example of the configurations of the main system and the subsystem.

FIG. 21 is a diagram showing an example of a configuration of the main system 20 and an example of a configuration of the subsystem 20. In this example, the functional elements having the same reference numerals as those of FIG. 5 have the same functions as explained above. Accordingly, duplicate explanation may be omitted, and main functional elements according to this example are mainly explained. The main system 50 according to this example may include a mode display unit 45. The mode display unit 45 includes a light source, such as an LED light emitter, an organic light emitter, or a lamp. The mode display unit 45 may turn on or off the light source. The mode display unit 45 may indicate the subsystem mode by a lighting state of the light source. For example, during a state in which the light source is turned on, the subsystem mode may be the single application allocation mode. During a state in which the light source is turned off, the subsystem mode may be the normal allocation mode.

Figure 22:
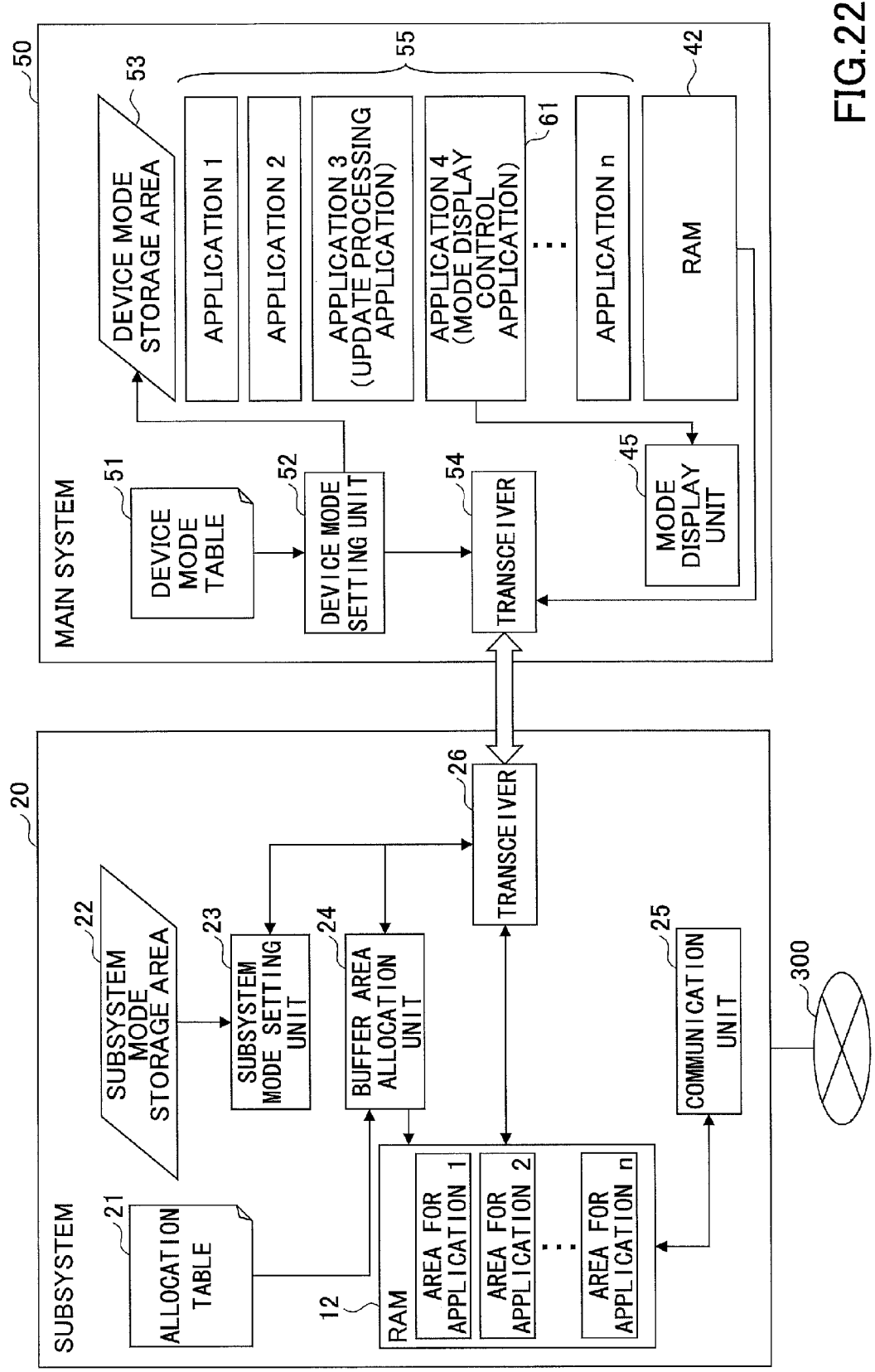
FIG. 22 is a functional block diagram of another example of the main system and the subsystem.

FIG. 22 is a functional block diagram showing an example of the main system 50 and an example of the subsystem 20. The device 100 according to this example may include the functions explained by referring FIGS. 5, 11, 14, 17, and/or 19. However, for simplicity of the explanation, only functional elements of the device 100 according to this example that are different from those of the above-described examples are explained. The main system 50 according to this example may include a mode display control application 61. The mode display control application 61 is an application that controls a lighting state of the mode display unit 45.

Specifically, when the subsystem mode is the normal allocation mode, the mode display control application 61 turns off the mode display unit 45. When the subsystem mode is the single application allocation mode, the mode display control application 61 turns on the mode display unit 45. In the device mode table 51 according to this example, for each of the subsystem modes, a corresponding lighting state of the mode display unit 45 is defined.

FIG. 23 is a diagram showing an example of the device mode table 51. For each of the subsystem modes, the corresponding lighting state (i.e., ON or OFF) is defined. Here, the lighting states are not limited to "ON" and "OFF." The lighting states may include a blinking state and/or a blinking period, for example. When the mode display unit 45 may indicate a subsystem mode by a corresponding color, the emission color may be defined, for example.

Figure 24:
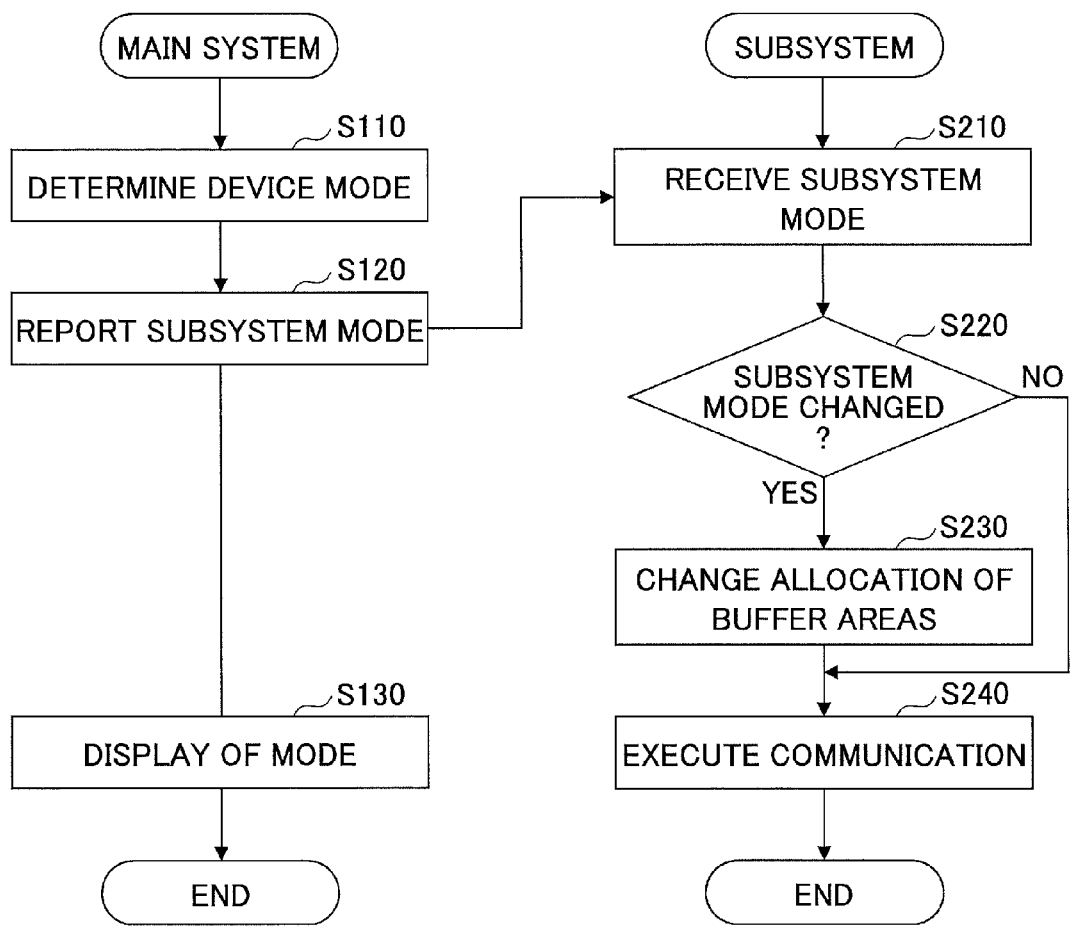
FIG. 24 is a flowchart showing an example of the procedure of the subsystem for changing the allocation of the buffer area.

FIG. 24 is a flowchart showing an example of a procedure of the subsystem 20 to allocate buffer areas.

The main system 50 determines a device mode (S110).

The device mode setting unit 52 determines a subsystem mode by referring the device mode table, and the device mode setting unit 52 reports the determined subsystem mode to the subsystem 20 (S120).

The processes by the subsystem 20 are same as those of FIG. 8. The transceiver 26 of the subsystem 20 receives the subsystem mode (S210).

The subsystem mode setting unit 23 determines whether the subsystem mode is changed (S220).

When the subsystem mode is changed (S220: Yes), the buffer area allocation unit 24 changes the allocation of the buffer areas (S230). The communication unit 25 starts communication (S240).

The mode display control application 61 of the main system 50 reads out the lighting state corresponding to the subsystem mode in the device mode table, and the mode display control application 61 turns on the mode display unit 45 (S130).

With the network system 500 according to this example, a user can confirm an allocation state of buffer areas in real time. For example, a user can recognize whether high speed communication is executed.

Hereinafter, another example of the device 100 is explained. In the device 100 according to this example, a user can select a display pattern.

In the device 100 according to the previous example, the lighting states statically correspond to the subsystem modes. For example, it is defined that, when the subsystem mode is the normal allocation mode, the lighting state is "OFF," and when the subsystem mode is the singles application allocation mode, the lighting state is "ON."

However, in some cases, a user may wish to turn on the light source when the subsystem mode is the normal allocation mode. Accordingly, in this example, the device 100 is explained that accepts user's setting of the lighting state corresponding to the subsystem mode.

Figure 25:
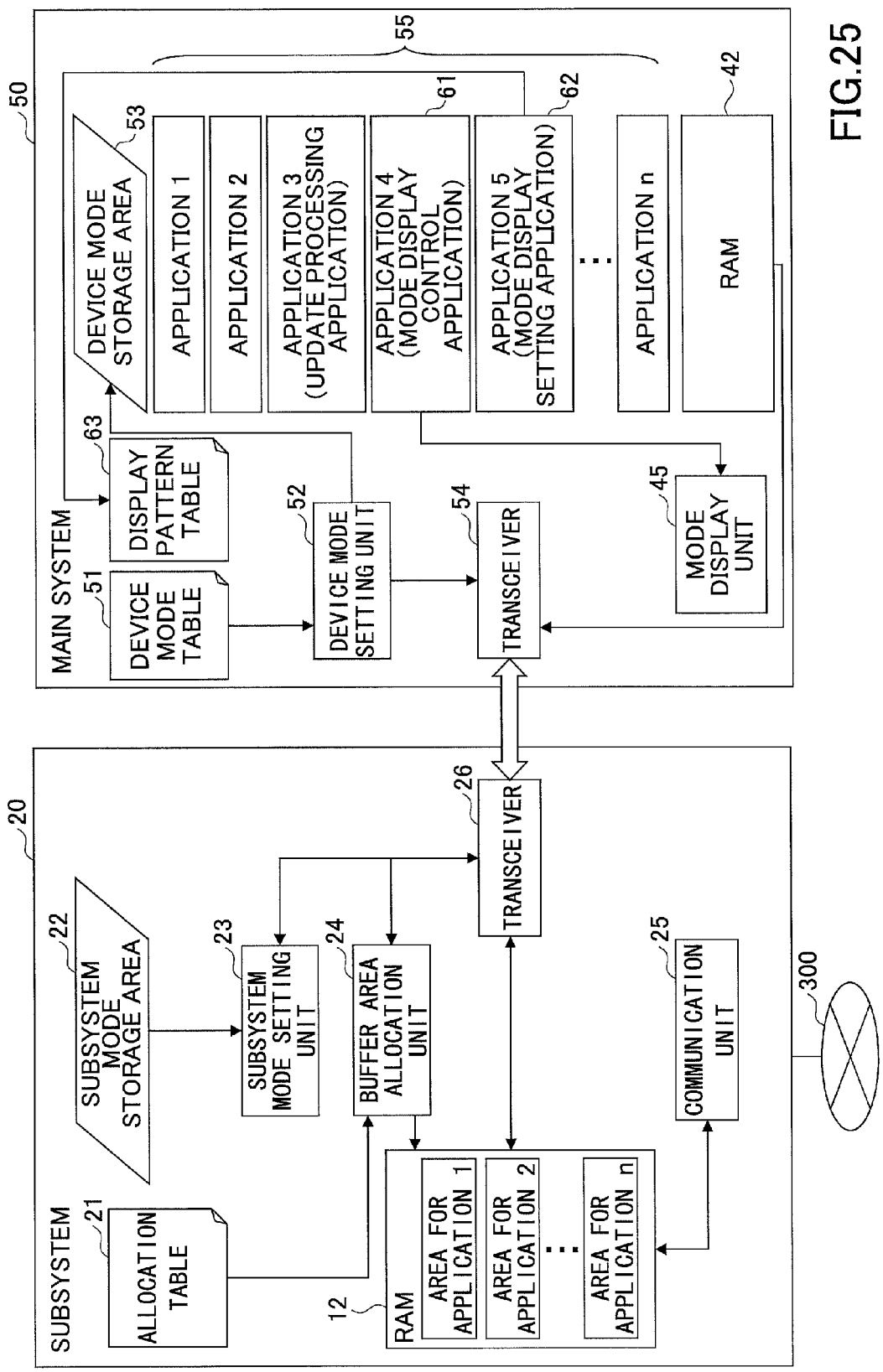
FIG. 25 is a functional block diagram of another example of the main system and the subsystem.

FIG. 25 is a functional block diagram of an example of the main system 50 and an example of the subsystem 20. The main system 50 according to this example is based on the example of the main system 50 shown in FIG. 22. The main system 50 according to this example may further include a mode display setting application 62; and a display pattern table 63.

The mode display setting application 62 accepts setting of whether the lighting state of "ON" corresponds to the state in which the light source is turned on or turned off, and the mode display setting application 62 accepts setting of whether the lighting state of "OFF" corresponds to the state in which the light source is turned on or turned off. Then, the mode display setting application 62 sets the setting of the lighting states in the display pattern table 63. For example, a predetermined menu may be displayed on a LCD, and a selected item may be accepted. Alternatively, a setting may be alternately switched by long press of a predetermined button.

FIGS. 26A and 26B are diagrams showing examples of the display pattern table 63. FIG. 26A shows an initial setting of the display pattern table 63. Similar to the previous example, the lighting state of "OFF" corresponds to the state in which the light source is turned off, and the lighting state of "ON" corresponds to the state in which the light source is turned on. When a user wishes to switch the display pattern table 63, the user operates the device 100 by using a button (not shown) or a menu displayed on the LCD. In this manner, the mode display setting application 62 creates the display pattern table 63 shown in FIG. 26B. In the display pattern table 63 shown in FIG. 26B, the lighting state of "OFF" corresponds to the state in which the light source is turned on, and the lighting state of "ON corresponds to the state in which the light source is turned off. Consequently, when the subsystem mode is the normal allocation mode, the mode display unit 45 is turned on, and when the subsystem mode is the single application allocation mode, the mode display unit 45 is turned off.

With the device 100 according to this example, a user can set desired display patterns for the corresponding subsystem modes.

Hereinafter, another example of the device 100 is explained. In the device 100 according to this example, a light emitter for data communication may be utilized as the mode display unit 45 according to the previous examples.

For example, when the communication unit 13 is an Ethernet (registered trademark) card, the communication unit 13 includes a fixed pair of LEDs. One of the pair of LEDs is referred to as a "LAN Active LED." The LAN Active LED emits light in an orange color during transmission and reception of data. The other one of the pair of LEDs is referred to as a "Link LED." The Link LED emits green light when the Ethernet card is normally connected to the network 300 (i.e., when communication is enabled).

In this example, when the lighting state is "ON" (or "OFF"), at least one of the pair of LEDs may be blinked in a special pattern (e.g., every 0.5 seconds). In this manner, the device mode can be indicated by existing LEDs, without newly introducing a mode display unit 45.

FIG. 27 is a diagram showing an example of the main system 50 and an example of the subsystem 20. Compared to FIG. 21, the mode display unit 45 may be missing. However, the communication device 13 may include LEDs 15.

Figures 28A, 28B:
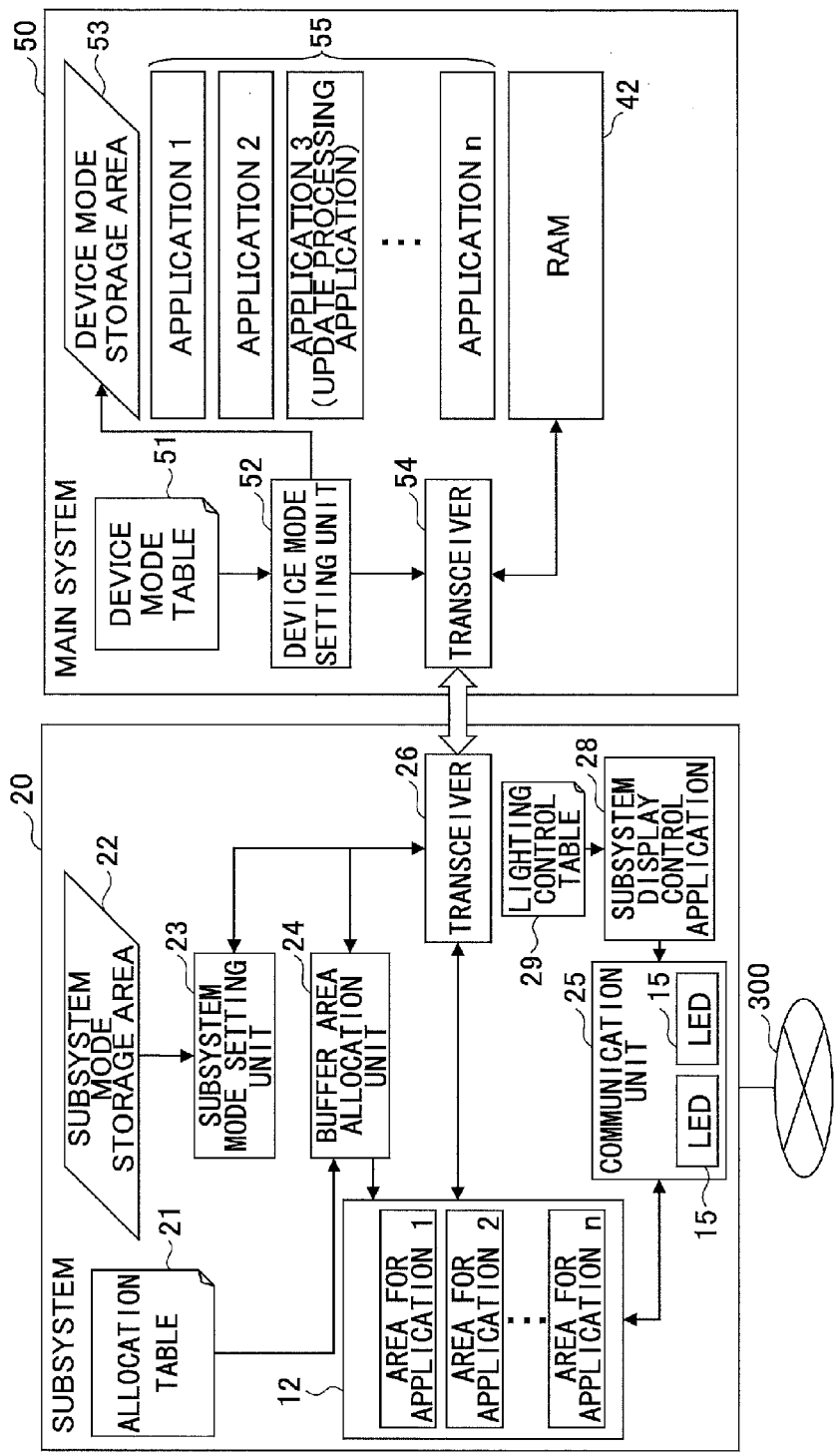
FIG. 28A is a functional block diagram of another example of the main system and the subsystem.
FIG. 28B is a diagram showing an example of a lighting control table.

FIG. 28A is a functional block diagram showing an example of the main system 50 and an example of the subsystem 20. The main system 50 may not include the mode display control application 61. However, the subsystem 20 may include a subsystem display control application 28; and a lighting control table 29. As shown in FIG. 28B, in the lighting control table 29, for each of the subsystem modes, a corresponding content of the lighting control is defined.

For each of the subsystem modes, a subsystem display control application 28 executes the corresponding lighting control of the LEDs 15 by referring to the lighting control table 29. For example, when the subsystem mode is the single application allocation mode, the subsystem display control application 28 periodically turns on and off the Link LED. In this manner, the Link LED can be blinked depending on the subsystem mode.

With the device 100 according to this example, a user can confirm the subsystem mode (the allocation of the buffer areas) in real time, without increasing the cost of the device 100.

Hereinabove, the information processing device is explained. The information processing device includes the first information communication unit including the communication unit for communicating with the external device; and the second information processing unit that is connected to the first information processing unit through the data communication line. However, the present invention is not limited to the specifically disclosed embodiment, and variations and modifications may be made without departing from the scope of the present invention.

Specific examples of numerical values are used in order to facilitate understanding of the invention. However, these numerical values are simply illustrative, and any other appropriate values may be used, except as indicated otherwise. A boundary of a functional unit or a processing unit in a functional block is not necessarily corresponds to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, or the like.

The present application is based on and claims the benefit of priority of Japanese priority application No. 2013-022367 filed on Feb. 7, 2013, the entire contents of which are hereby incorporated herein by reference.

What is claimed is:

1. An information processing device comprising:
a first information processing unit including a communication unit configured to communicate with an external device; and
a second information processing unit configured to be connected to the first information processing unit through a data communication line,
wherein the second information processing unit includes a plurality of information processors,
wherein the first information processing unit includes
a data storage unit configured to store data received from the external device by the communication unit;
a first table configured to define correspondence between each of first operation modes of the first information processing unit and memory area sizes that are to be reserved for the corresponding information processors to process the data, wherein each of the first operation modes of the first information processing unit is determined by corresponding one of second operation modes of the second information processing unit; and
a memory area allocation unit configured to allocate memory areas having the corresponding memory area sizes to the corresponding information processors, wherein the memory area sizes correspond to a current one of the first operation modes of the first information processing unit in the first table, and the memory areas are included in the data storage unit, and wherein the memory area allocation unit is further configured to change the allocation of the memory areas depending on the first operation mode, such that, for each first operation mode, corresponding allocation of memory areas are optimized,
wherein the second information processing unit further includes
a plurality of second tables, wherein each of the plurality of second tables is configured to determine correspondence between the second operation modes of the second information processing unit and the first operation modes of the first information processing unit;
a second selection criteria storage unit configured to store second selection criteria for selecting corresponding second tables;
a second table selection unit configured to select one of the second tables based on the corresponding one of the second selection criteria stored in the second selection criteria storage unit; and
a first operation mode transmitter configured to read out one of the first operation modes of the first information processing unit corresponding to one of the second operation modes of the second information processing unit from the one of the second tables selected by the second table selection unit, and configured to transmit the one of the first operation modes to the first information processing unit,
wherein the memory area allocation unit is configured to allocate the memory areas having the memory area sizes corresponding to the one of the first operation modes of the first information processing unit in the first table to the corresponding information processors, and wherein the one of the first operation modes of the first information processing unit is received from the second information processing unit.

2. The information processing device according to claim 1,
wherein the first information processing unit further includes
a plurality of the first tables;
a first selection criteria storage unit configured to store first selection criteria for selecting the corresponding first tables; and
a first table selection unit configured to select one of the first tables based on the corresponding one of the first selection criteria stored in the first selection criteria storage unit;
wherein the memory area allocation unit is configured to allocate, in the first table selected by the first table selection unit, the memory areas having the memory area sizes corresponding to the one of the first operation modes of the first information processing unit received from the second information processing unit to the corresponding information processors.

3. The information processing device according to claim 1,
wherein the second information processing unit further includes
an account information storage unit configured to store account information items and the second selection criteria, wherein each of the account information items corresponds to one of the second selection criteria in the account information storage unit; and
a second selection criteria setting unit configured to read out one of the second selection criteria corresponding to the account information item of a user who logs in to the information processing device, and configured to store the one of the second selection criteria in the second selection criteria storage unit,
wherein the second table selection unit is configured to select one of the second tables based on the one of the second selection criteria stored in the second selection criteria storage unit.

4. The information processing device according to claim 1,
wherein the second information processing unit further includes
a radio communication unit configured to execute radio communication with the external device; and
a radio communication controller configured to control the radio communication unit,
wherein, when the radio communication unit communicates with the external device, the radio communication controller stores predetermined one of the second selection criteria in the second selection criteria storage unit, and
wherein the second table selection unit is configured to select one of the second tables based on the predetermined one of the second selection criteria stored in the second selection criteria storage unit.

5. The information processing device according to claim 1,
wherein the information processing device further includes
a display unit that can be visually observed from outside the information processing device,
wherein each of the second tables of the second information processing unit is configured to define correspondence between the first operation modes of the first information processing unit and lighting control information items; and
wherein the second information processing unit further includes
a second display unit controller configured to read out one of the lighting control information items corresponding to the one of the second operation modes of the second information processing unit from the selected one of the second tables, and configured to control the display unit in accordance with the one of the lighting control information items.

6. The information processing device according to claim 5,
wherein the second information processing unit further includes
a first lighting state table configured to define correspondence between the light control information items and lighting states; and
a lighting state setting reception unit configured to receive a setting that defines the correspondence between the lighting states and the lighting control information items.

7. The information processing device according to claim 5,
wherein the display unit is a light emitter that is fixed to the communication unit, and
wherein the first information processing unit further includes
a second lighting state table configured to determine correspondence between the first operation modes and lighting states; and
a first display unit controller configured to control the light emitter in accordance with one of the lighting states read out from the second lighting state table based on one of the first operation modes of the first information processing unit.

8. The information processing device according to claim 1,
wherein, when the first information processing unit and the second information processing unit communicate with each other through the data communication line, in the first table, one of the first operation modes corresponds to memory area sizes reserved for the corresponding information processors, and
wherein the memory area allocation unit is configured to allocate memory areas having the memory sizes corresponding to the one of the first operation modes of the first information processing unit to the corresponding information processors as a memory area for storing data that is transmitted from the first information processing unit to the second information processing unit, wherein the memory areas are included in the data storage unit.

9. An information processing device comprising:
a first information processing unit including a communication unit configured to communicate with an external device;
a second information processing unit configured to be connected to the first information processing unit through a data communication line;
a plurality of information processors;
a data storage unit configured to store data that is received from the external device by the communication unit;
a first table configured to determine correspondence between each of first operation modes of the first information processing unit and memory area sizes that are to be reserved for the corresponding information processors to process the data, wherein each of the first operation modes of the first information processing unit is determined by corresponding one of second operation modes of the second information processing unit; and
a memory area allocation unit configured to allocate memory areas having the memory area sizes corresponding to a current one of the first operation modes of the first information processing unit in the first table to the corresponding information processors, wherein the memory areas are included in the data storage unit, and wherein the memory area allocation unit is further configured to change the allocation of the memory areas depending on the first operation mode, such that, for each first operation mode, corresponding allocation of memory areas are optimized,
wherein the information processing device further comprises
a plurality of second tables, wherein each of the plurality of second tables is configured to determine correspondence between the second operation modes of the second information processing unit and the first operation modes of the first information processing unit;
a second selection criteria storage unit configured to store second selection criteria for selecting corresponding second tables;
a second table selection unit configured to select one of the second tables based on the corresponding one of the second selection criteria stored in the second selection criteria storage unit; and
a first operation mode transmitter configured to read out one of the first operation modes of the first information processing unit corresponding to one of the second operation modes of the second information processing unit from the one of the second tables selected by the second table selection unit, and configured to transmit the one of the first operation modes to the first information processing unit,
wherein the memory area allocation unit is configured to allocate the memory areas having the memory area sizes corresponding to the one of the first operation modes of the first information processing unit in the first table to the corresponding information processors, and wherein the one of the first operation modes of the first information processing unit is received from the second information processing unit.

* * * * *